United States Patent [19]
Yamazaki et al.

[11] Patent Number: 5,687,007
[45] Date of Patent: Nov. 11, 1997

[54] IMAGE READING DEVICE INCLUDING PREVENTION OF THERMALLY INDUCED COMPONENT DISLOCATION

[75] Inventors: Yoshihiro Yamazaki; Masahiro Oono, both of Tokyo, Japan

[73] Assignee: Asahi Kogaku Kogyo Kabushiki Kaisha, Tokyo, Japan

[21] Appl. No.: 607,371

[22] Filed: Feb. 27, 1996

[30] Foreign Application Priority Data

Feb. 28, 1995 [JP] Japan .................. 7-065164

[51] Int. Cl.$^6$ ........................................... H04N 1/24
[52] U.S. Cl. ............................. 358/474; 358/473
[58] Field of Search .......................... 358/471–475, 358/497; 382/313; 395/101, 103, 105, 114, 80, 84, 88

[56] References Cited

U.S. PATENT DOCUMENTS 5,027,424  6/1991  Yamazaki et al. ................ 382/65
5,121,226  6/1992  Kubota et al. ..................... 358/473
5,446,559  8/1995  Birk ................................... 358/472

*Primary Examiner*—Edward L. Coles, Sr.
*Assistant Examiner*—Stephen Brinich
*Attorney, Agent, or Firm*—Greenblum & Bernstein P.L.C.

[57] ABSTRACT

A housing includes a first portion and second portion. Each of the first and second portions supports a mirror and are connected and prevented from independent movement through a cover glass plate. The connection between the portions of the housing reduces the amount of angular change of mirrors within the housing resulting from a change in temperature, and thereby reduces the amount of displacement of a reading point of an image receiving element during the temperature change. The reading point is projected along an optical path including multiple reflections from the mirrors. A first connection device tightly fits the cover glass plate between the first and second portions of the housing, and a second connection device adheres the cover glass plate to the first and second portions of the housing.

22 Claims, 30 Drawing Sheets

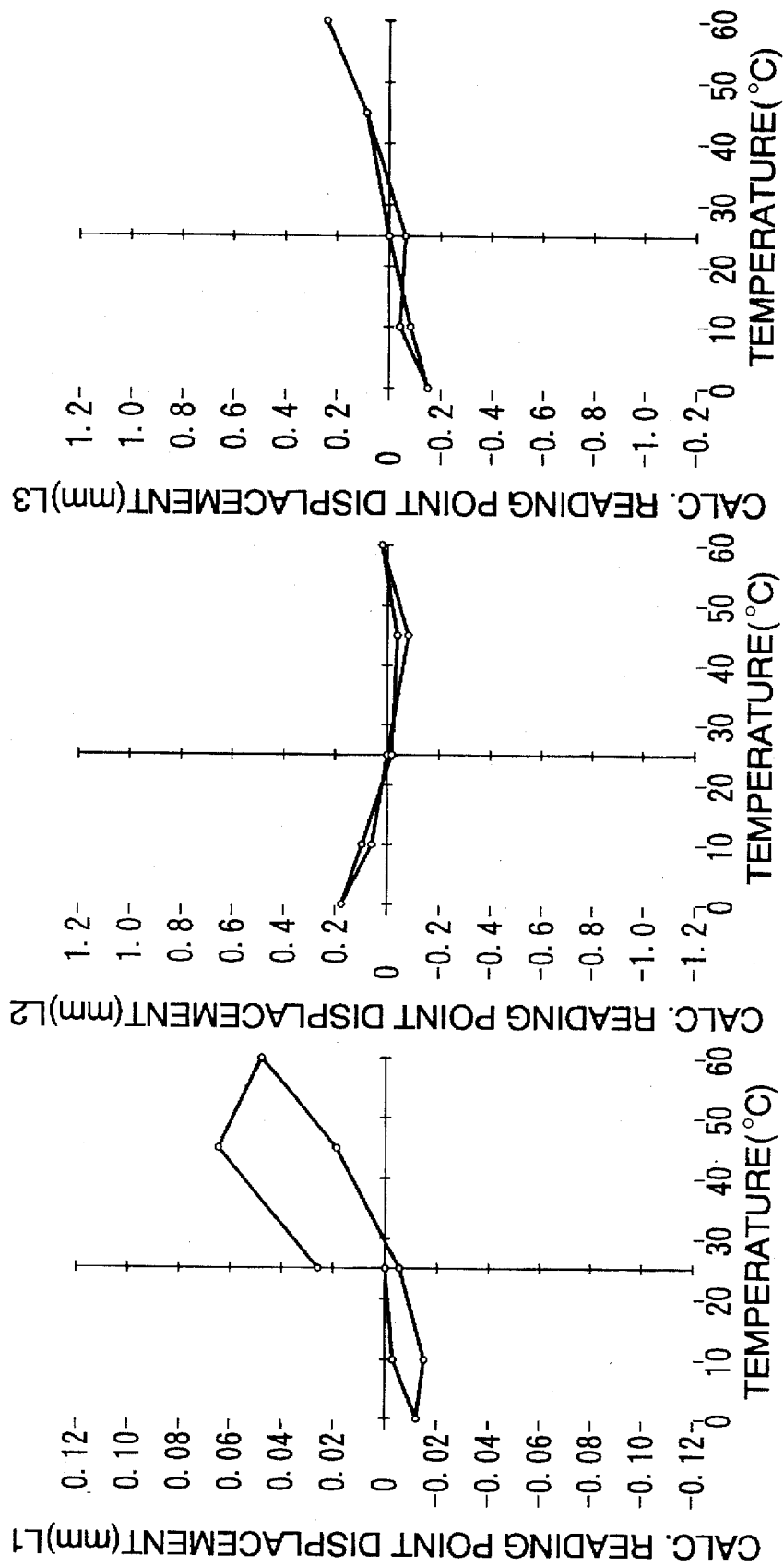

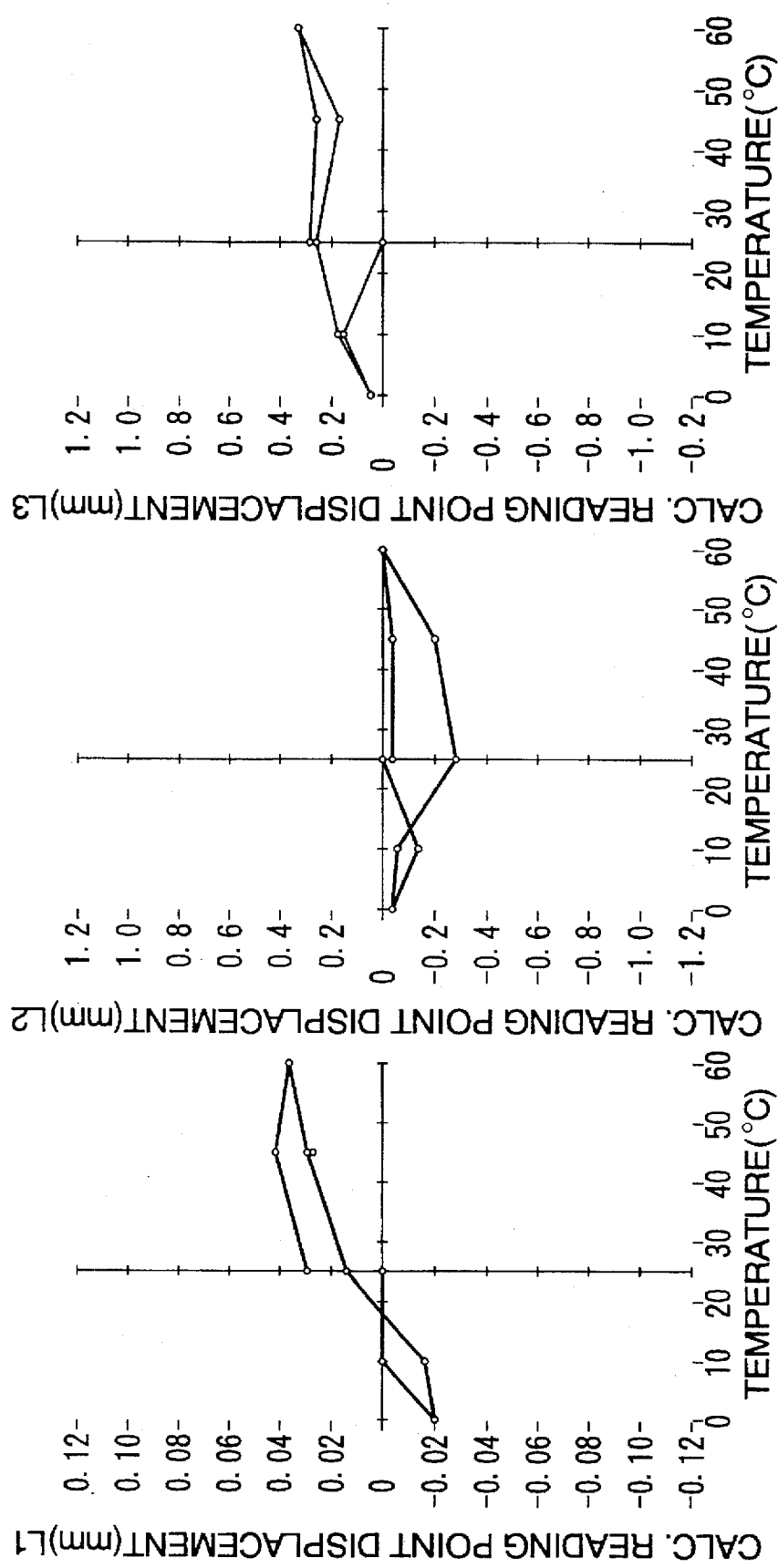

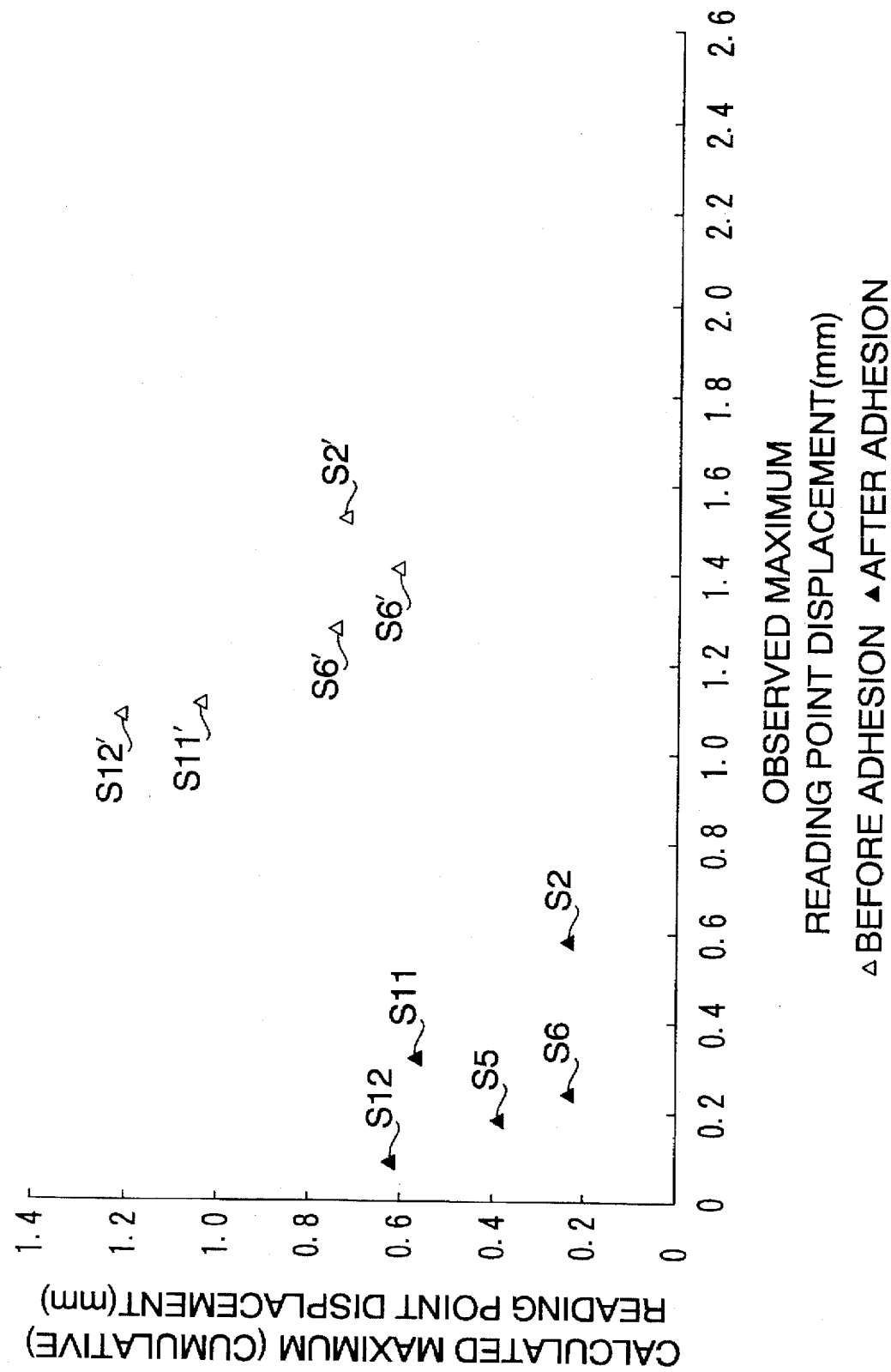

IMAGE READING DEVICE INCLUDING PREVENTION OF THERMALLY INDUCED COMPONENT DISLOCATION

BACKGROUND OF THE INVENTION

The present invention relates to an image reading device such as an image scanner or a facsimile machine, and more particularly, to a reading unit employing mirrors.

Conventionally, an image scanner or facsimile machine reads a pattern on a manuscript set on a cover glass plate by moving a reading unit containing a light detecting element, such as a charge coupled device (CCD) sensor. Alternatively, the manuscript is moved past a stationary reading unit. Light reflected from an illuminated manuscript enters a housing of the reading unit through a cover glass plate, and is reflected by a plurality of mirrors. The image of the pattern on the manuscript is formed on the light detecting element by an imaging lens system between the mirrors and the light detecting element. The mirrors maintain a predetermined light path within the compact housing.

Usually, to save weight and expense, the housing of the image reading unit is constructed of plastic resin, and has a high thermal expansion. Accordingly, when the ambient temperature varies, the angle of each of the mirrors changes independently due to the thermal deformation of the housing.

As each of the mirrors becomes angled differently, the position of the image formed by the imaging lens system my become displaced from the light detecting element making for poorly detected or undetected images.

SUMMARY OF THE INVENTION

It is therefore an object of the present invention to provide an improved image reading device capable of preserving the transmittal path of an image reflected by mirrors therein during a temperature change.

In order to meet the objects of the invention, an image reading device for reading an image of a scanned manuscript includes a housing including a first portion and a second portion, a reading window formed in the busing, the reading window separating the first portion and the second portion of the housing and extending perpendicularly to a direction of scanning. A cover glass plate is secured in the housing between the first portion and the second portion, the cover glass plate covering the reading window and allowing light reflected from the manuscript to enter the housing. An imaging optical element for forming an image from the light, an image receiving element for detecting the image, and a plurality of mirrors are provided for reflecting, light from the manuscript to the imaging optical element. Each of the first portion and the second portion support at least one of the plurality of mirrors. A device connects the first portion and the second portion to prevent independent movement of the first portion and second portion and to prevent independent movement of the plurality of mirrors.

By preventing the independent movement of the first portion and second portion and the mirrors supported thereon, the mirrors are kept from a large angular change, thereby preventing large displacements of a reading point of the light receiving element.

Preferably, the plurality of mirrors includes a first mirror supported by the second portion, a second mirror supported by the first portion, and a third mirror supported by the second portion. The first mirror is positioned on the second portion to reflect light from the manuscript, the second mirror is positioned on the first portion to reflect light from the first mirror and the third mirror is positioned on the second portion to reflect the light from the second mirror to the imaging optical element. In this case, the second mirror and the third mirror are preferably arranged so that light goes back and forth between the second and third mirrors a plurality of times.

According to one embodiment of the invention, the cover glass plate is tightly fitted into a seating step formed around the reading window, and the cover glass plate connects the first portion and the second portion to prevent independent movement of the first portion and the second portion. In this case, the housing is preferably made of plastic resin.

According to another embodiment of the invention, the cover plate is bonded by adhesive to the first portion and to the second portion, and the cover glass plate and the adhesive connect the first portion and the second portion to prevent independent movement of the first portion and the second portion. In this case, the adhesive is preferably an ultraviolet curing adhesive. Further preferably, the housing is made of plastic resin.

According to another aspect of the present invention, an image reading device for reading ah image of a scanned manuscript includes a resin plastic housing including a first portion and a second portion, a reading window formed in the housing, the reading window separating the first portion and the second portion of the housing and extending perpendicularly to a scanning direction. A cover glass plate is secured in the housing between the first portion and the second portion, the cover glass plate covering the reading window and allowing light reflected from the manuscript to enter the housing. An imaging optical element for forming an image from the light, an image receiving element for detecting the image, and a plurality of mirrors for reflecting light from the manuscript to the imaging optical element, are provided. Each of the first portion and the second portion support at least one of the plurality of mirrors, and each of the plurality of mirrors undergoes a predetermined angular change in response to thermal change. A device for connecting the first portion and the second portion and a device for limiting the predetermined angular change of the plurality of mirrors are provided.

Accordingly, by limiting the predetermined angular change of the plurality of mirrors, the displacement of a reading point of the image receiving element can be reduced in conditions of thermal change, allowing the image reading device to operate in a range of temperatures.

Preferably, the plurality of mirrors includes a first mirror supported by the second portion, a second mirror supported by the first portion and a third mirror supported by the second portion. The first mirror is positioned on the second portion to reflect light from the manuscript, the second mirror is positioned on the first portion to reflect light from the first mirror and the third mirror is positioned on the second portion to reflect the light from the second mirror to the imaging optical element. In this case, the second mirror and the third mirror are arranged so that light goes back and forth between the second and third mirrors a plurality of times.

In a preferred embodiment, the cover glass plate is tightly fitted into a seating step formed around the reading window, and the cover glass plate connects the first portion and the second portion and limits the predetermined angular change of the plurality of mirrors. In this case, the housing is preferably made of plastic resin.

In another preferred embodiment, the cover plate Is bonded by adhesive to the first portion and to the second portion, and the cover glass plate and the adhesive connect the first portion and the second portion and limit the predetermined angular change of the plurality of mirrors. In this case, the adhesive is preferably an ultraviolet curing adhesive. Further, the housing is preferably made of plastic resin.

According to another aspect of the present invention, an image reading device for reading an image of a scanned manuscript, the device includes a plastic resin housing including a first portion and a second portion, the housing undergoing a predetermined dimensional change in response to thermal change, a reading window formed in the housing, the reading window separating the first portion and the second portion of the housing and extending perpendicularly to a direction of scanning, a cover glass plate secured in the housing between the first portion and the second portion, the cover glass plate covering the reading window and allowing light reflected from the manuscript to enter the housing, an imaging optical element for forming an image from the light an image receiving element for detecting the image, and a plurality of mirrors for reflecting light from the manuscript to the imaging optical element. Each of the first portion and the second portion support at least one of the plurality of mirrors. A device for biasing the first portion and the second portion of the housing is provided so as to absorb a portion of the predetermined dimensional change.

Accordingly, by biasing the first and second portions, a combination of compressive and bending stress is created that can absorb dimensional changes of the housing during thermal change. The reduction of dimensional change from the absorption can reduce the movement of the plurality of mirrors, preventing displacement of a reading point of the image receiving device during temperature change.

Preferably, the plurality of mirrors includes a first mirror supported by the second portion, a second mirror supported by the first portion, and a third mirror supported by the second portion. The first mirror is positioned on the second portion to reflect light from the manuscript, the second mirror is positioned on the first portion to reflect light from the first mirror and the third mirror is positioned on the second portion to reflect the light from the second mirror to the imaging optical element. In this case, the second mirror and the third mirror are arranged so that light goes back and forth between the second and third mirrors a plurality of times.

In a preferred embodiment, the cover glass plate is tightly fitted into a seating step formed around the reading window, and the cover glass plate biases the first portion and the second portion of the housing so as to absorb a portion of the predetermined dimensional change. In this case, the housing is preferably made of elastic resin.

BRIEF DESCRIPTION OF THE DRAWINGS

FIGS. 13A through 13C are charts showing the displacement of a reading point on the cover glass versus temperature change, calculated based on the data of FIGS. 12A through 12C, respectively;

FIGS. 16A through 16C are charts showing the displacement of a reading point on the cover glass versus temperature change, calculated based on the data of FIGS. 15A through 15C, respectively;

FIG. 32 is a chart showing calculated cumulative reading point displacement versus observed total reading point displacement, preceding and following the application of adhesive, for the second through sixth experimental samples according to the second embodiment.

DETAILED DESCRIPTION OF THE PREFERRED EMBODIMENTS

Figure 1:
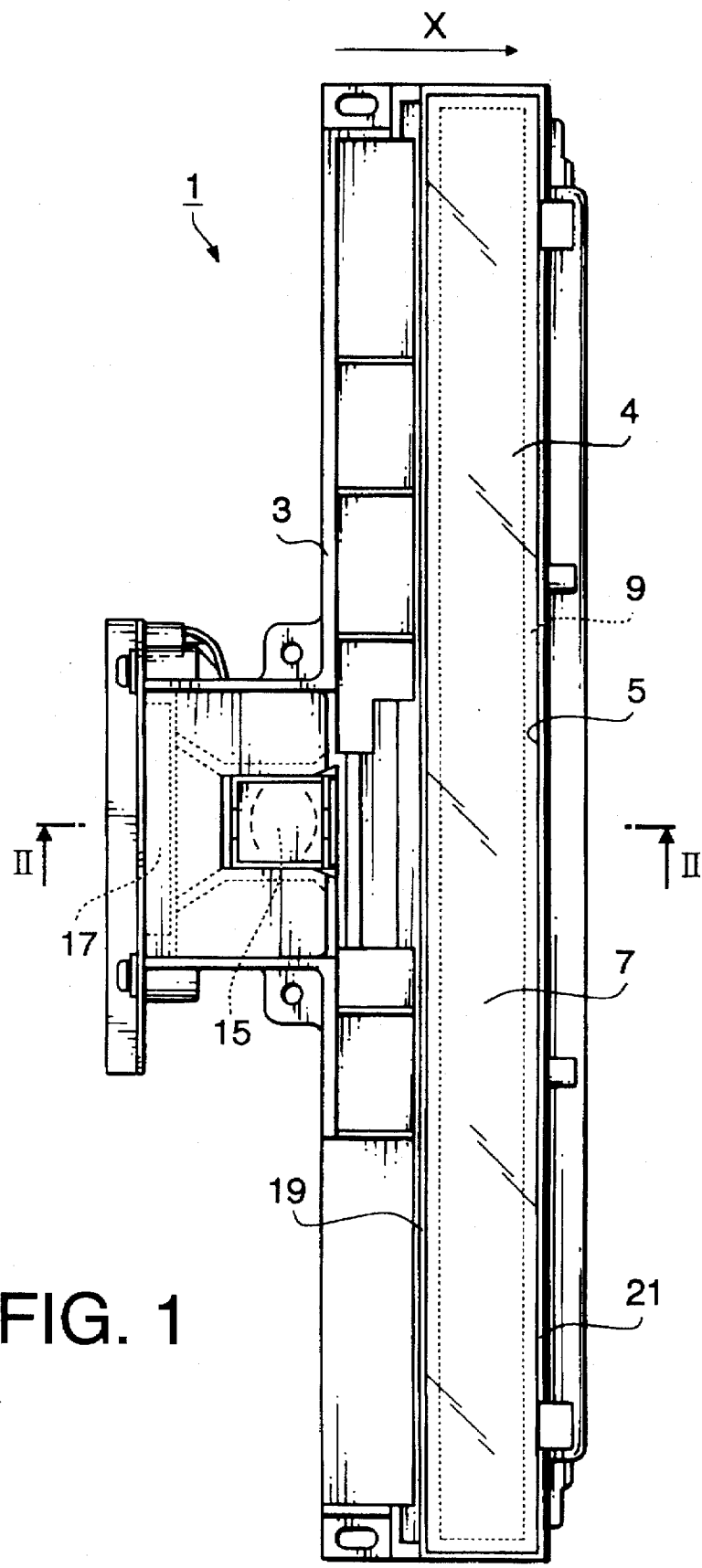
FIG. 1 is a plan view of an image reading device according to the embodiments of the invention.

FIG. 1 is a plan view of an image reading unit 1 to be applied in an image reading device according to the invention. The image reading unit 1 reads a manuscript scanned along a direction X (shown in FIGS. 1 and 2) in a facsimile machine or image scanner. The image reading unit 1 includes a housing 3, unitarily molded from plastic as a single block, in which various optical elements are mounted. A reading window 4 (shown by a broken line in FIG. 1) is formed in a face (hereinafter referred to as the bottom face) of the housing 3. The reading window 4 extends perpendicularly to the scanning direction (shown by an arrow X in FIGS. 1 and 2) of the manuscript 11.

Figure 2:
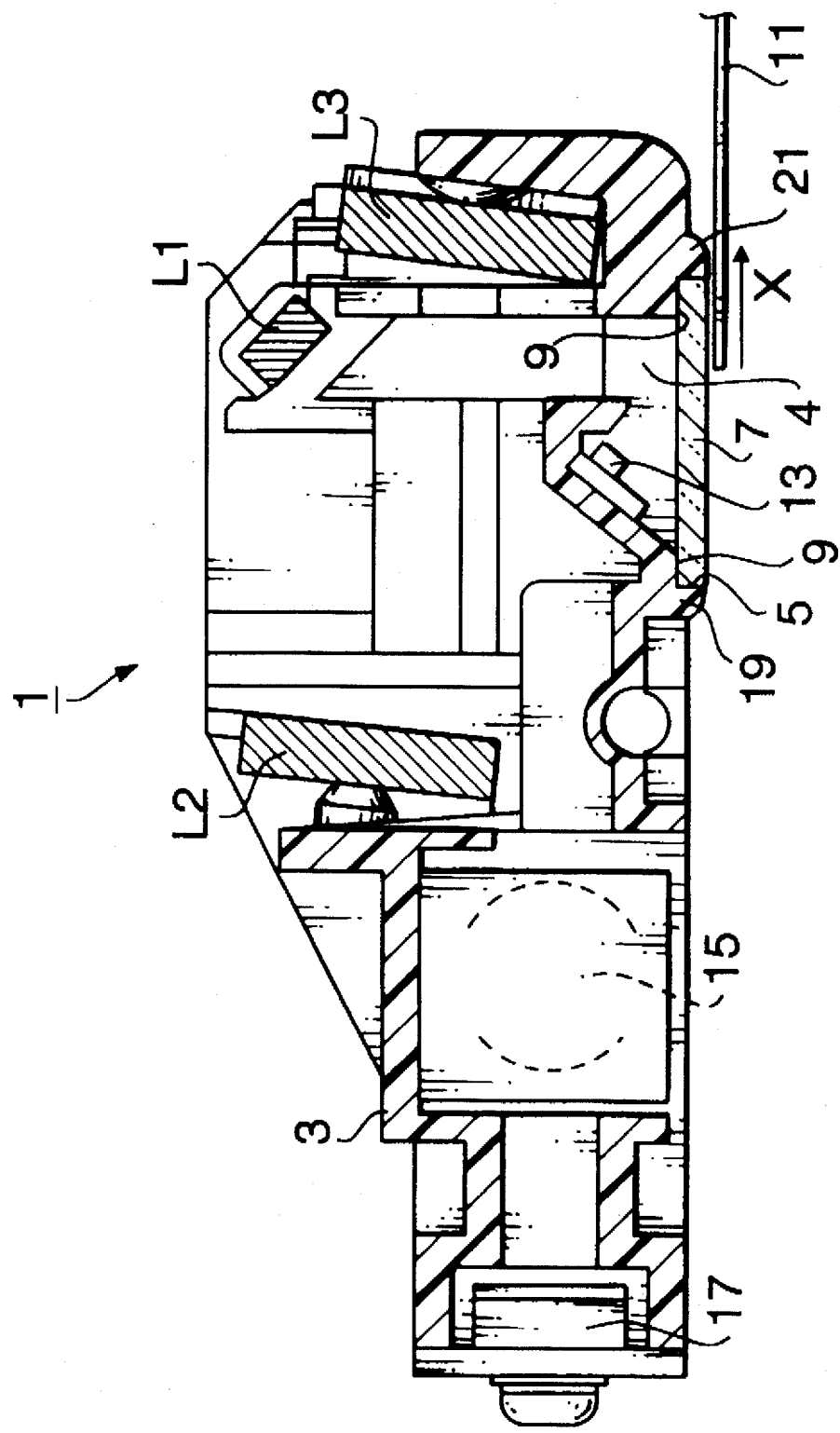
FIG. 2 is a side sectional view of the image reading device of the embodiments, taken along the section line II—II of FIG. 1.

FIG. 2 is a side sectional view taken along the line II—II of FIG. 1. As shown is FIG. 2, the reading window 4 is covered by cover glass plate 7 secured to the housing 3. More specifically, a seating step 5, having a seating shelf 9 as a lower reference surface, is formed in the housing surrounding the reading window 4.

As shown in FIG. 2, a light source 13 for illuminating the manuscript 11 set on the cover glass plate 7, a first mirror L1, a second mirror L2, a third mirror L3, an imaging lens 15 (as an imaging optical system) and a CCD sensor 17 (as a light receiving element) are arranged in the housing 3. In a cavity behind the cover glass plate 7, the first mirror L1 is arranged at an angle to the cover glass plate 7 and opposite the cover glass plate 7, the second mirror L2 opposes the first mirror L1, and the third mirror L3 is substantially parallel to the second mirror L2 across the cavity, directly opposing the second mirror L2. A channel extends from the cavity, and the imaging lens 15 opposes the third mirror L3 from within the channel. Behind the imaging lens 15 in the channel is the CCD sensor 17.

Figure 3:
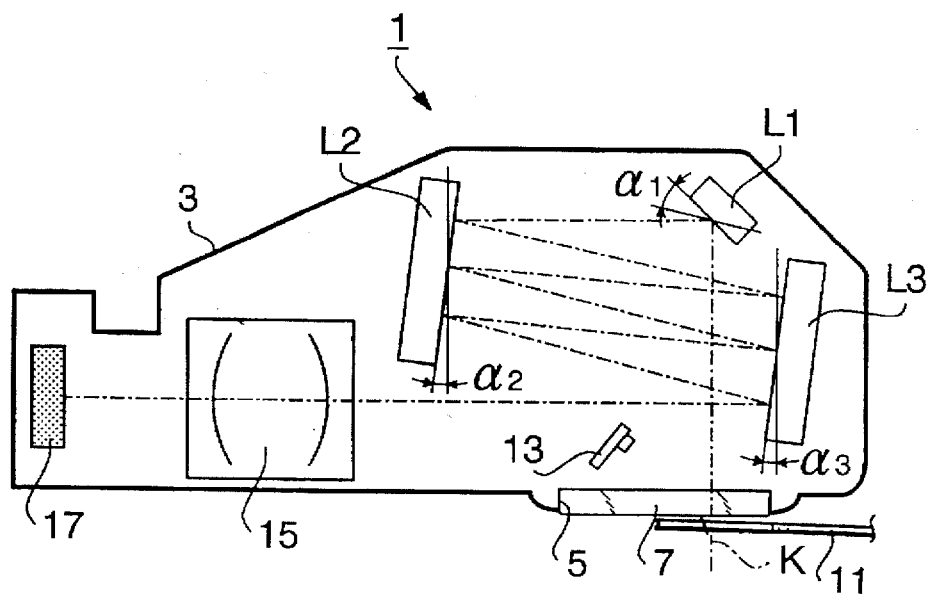
FIG. 3 is a side schematic view showing a light path from a manuscript to the light detecting element within the image reading device of the embodiments.

FIG. 3 is a side schematic view showing the optical paths within the reading unit in the embodiments of an image reading device according to the invention. An optical axis K of the imaging system coincides with an optical axis of the imaging lens 15. As shown in FIG. 3, the light source 13 illuminates the manuscript 11 set on the cover glass plate 7. Light reflected from the manuscript 11 is transmitted through the cover glass plate 7, and is reflected by the first mirror L1 toward the second mirror L2. The second and third mirrors L2 and L3 are arranged so that the light travels back and forth a plurality of times therebetween. In the optical unit 1 embodying the present invention, the light reflected from the first mirror L1 is reflected three times by each of the second and third mirrors L2 and L3 respectively. Finally, the reflected light from the third mirror L3 is incident on the imaging lens 15, and forms an image of the manuscript on the CCD sensor 17. The CCD sensor 17 outputs the signal that contains the information of the manuscript 11.

Figure 4:
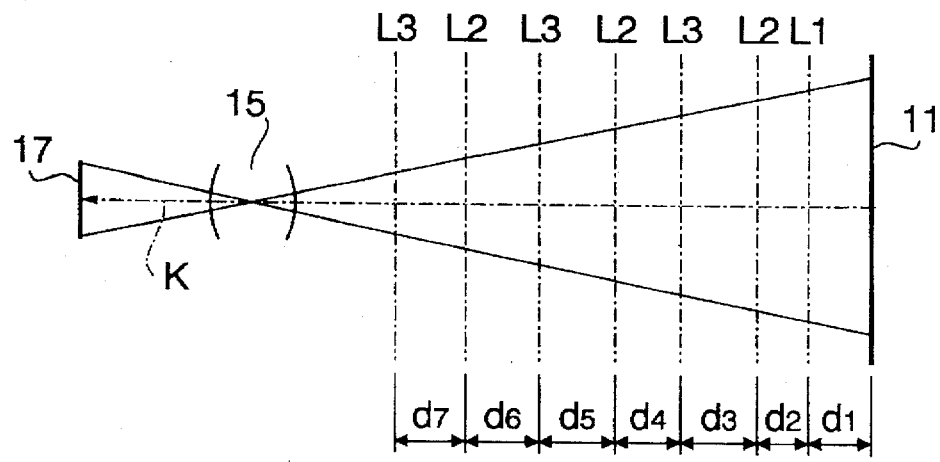
FIG. 4 is a development view of the unfolded light path of FIG. 3.

FIG. 4 is a schematic showing the optical path of optical axis K of FIG. 3 in developed form (i.e., optically "unfolded"). The light path between the cover glass plate 7 and the first mirror L1 is equal to a distance d1, and the light path from the first mirror L1 to the second mirror L2 is equal to a distance d2. Distances d3 through d7 are rebounding light paths between the second mirror L2 and the third mirror L3, and the distances d3 through d7 are substantially the same.

The angles of the mirrors L1, L2 and L3 with reference to the housing 3 are subject to change according to the deformation of the housing 3 due to the change of temperature. The optical path is affected by the angular changes. The changing angles of the mirrors L1, L2 and L3 are defined as $\alpha1$, $\alpha2$, and $\alpha3$, respectively.

When the angle of at least one of the mirrors L2) and/or L3 changes with reference to the housing 3, the reading point of the CCD sensor (projected to the cover glass plate 7) is displaced along the scanning direction X of the manuscript 11. The reading point is hereinafter defined as a point projected to the cover glass plate which forms an image on the CCD sensor 17. At any given angular change of a mirror, the resulting displacement of the reading point becomes larger as the distance between the mirror and the cover glass plate 7 increases. Thus, displacement of the reading point per unit of angular change of the first mirror L1 is smaller than those of the remaining mirrors L2 and L3.

Table 1 shows an observed relationship between angular change in a given range (for each of the mirrors L1, L2, and L3, in minutes of arc) and the resulting displacement $\delta$ of the reading point. In this table, the ratio k expresses the amount of displacement of the reading point per minute of arc change in the angle of the particular mirror.

TABLE 1

| MIRROR | RANGE (min.) | δ (mm) | k (mm/min.) |
| --- | --- | --- | --- |
| L1 | ±6' | 0.096 | 0.016 |
| L2 | ±6' | −1.182 | −0.197 |
| L3 | ±6' | 1.506 | 0.251 |

For instance, if the first mirror L1 is inclined by 6' from the initial position, the reading point on the cover glass plate 7 moves 0.096 mm along the scanning direction X. Sensitivity of the first mirror is equal to 0.016 millimeters of reading point displacement per minute of angular change in the position of the first mirror L1. In the same manner, the sensitivity of the second mirror L2 is −0.197 mm/min. and that of the third mirror L3 is 0.251 mm/min. From the positional relationships of the mirrors, and considering small angle relationships, the following three relations are used to calculate a predicted displacement δ of the reading point for a given angular displacement of a mirror:

$$\delta = 2 \cdot d1 \cdot \alpha 1 \quad (1)$$

for the first mirror L1, $$\delta = -6 \cdot (d1 + d2 + 2 \cdot d3) \cdot \alpha 2 \quad (2)$$

for the second mirror L2, and $$\delta = 6 \cdot (d1 + d2 + 3 \cdot d3) \cdot \alpha 3 \quad (3)$$

for the third mirror L3.

The distances d1 through d7 (as shown in FIG. 4) and the focal length of the imaging lens 15 are determined in accordance with those of a typical facsimile machine.

It can be seen that angular change of the second and third mirrors L2 and L3, which each reflect the light a plurality of time, strongly displace of the reading point. Particularly, the angular change of the third mirror L3, which is located at the nearest position to the imaging lens 15, has the largest effect. Thus, the third mirror L3 has the highest sensitivity. It can be further seen that the sensitivities of the second and third mirrors L2 and L3 are of similar absolute value, but are in opposite directions when the mirrors are inclined in the same direction.

Thus, to reduce the displacement of the reading point in varying temperatures, it is important to reduce the amount of inclination of the second and third mirrors L2 and L3. Furthermore, displacement of the reading point generated by the second and third mirrors L2 and L3 may be counterbalanced when mirrors L2 and L3 are inclined in the same direction by a similar angle.

As shown in FIGS. 1 and 2, the housing 3 has first and second portion 19 and 21 that are peripherally connected, but are separated by the reading window 4. That is, the second portion 21 opposes the first portion 19 across the reading window 4. The second mirror L2 is mounted on the first portion 19, and the first and third mirrors L1, L3 are mounted on the second portion 21.

Figure 5:
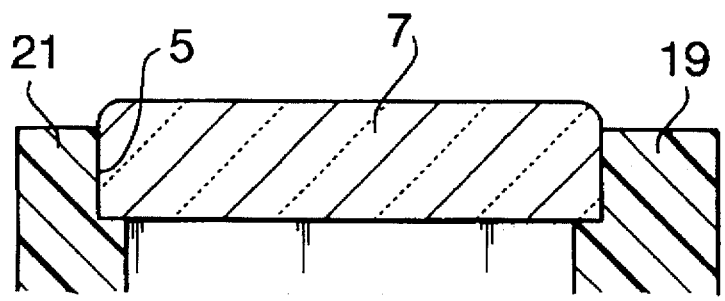
FIG. 5 is an enlarged view of a cover glass shown in FIG. 2 according to the first embodiment of the invention.

In the first embodiment, as shown in FIG. 5, the cover glass plate 7 is formed slightly larger than the seating step 5 so that the plate 7 is tightly fitted in the seating step 5. Accordingly, the cover glass plate 7 minutely pushes the first portion 19 and the second portion 21 away from each other. Thus, when the cover glass plate 7 is inserted into the seating step 5, the first and second portions 19 and 21 are placed under a constant compressive stress toward the edges and a constant bending stress toward the center, and a biasing force (toward each other) is generated within the first and second portions 19 and 21. The biasing force keeps the first and second portions 19 and 21 always in contact with the cover glass plate 7, even in conditions of thermal expansion and contraction.

Relative to the plastic housing 3, and the first and second portions 19 and 21, the cover glass plate is not subjected to thermal expansion. Accordingly, in a range of normal operating temperatures, the cover glass plate 7 does not significantly deform. At the same time, since the first and second portions 19, 21 are constantly urged toward each other by the biasing force Induced by the tight fitting of the cover glass plate 7, dimensional change due to temperature, particularly enlarging of the housing 3 due to temperature increase, does not cause the first and second portions to move away from one another. Thus, the force applied by the cover glass plate 7 to each of the first and second portions 19 and 21 creates internal stress and a biasing force in each, preventing the portions 19 and 21 from moving away from one another due to expansion caused by temperature. As a result, the deformation of the second portion 21 (which is easily deformed when able to expand freely with respect to the first portion 19) can be reduced, and the angular change of the third mirror L3, in particular, is significantly reduced.

Furthermore, in the first embodiment, when the housing 3 is deformed by temperature change, since the portions 19 and 21 are biased to contact the sides of the cover glass plate 7, the first and second portions 19 and 21 are relatively fixed with respect to each other, and undergo angular change in the same direction. Thus, since the second and third mirrors L2 and L3 incline in the same direction, but generate displacement of the reading point in opposite directions, the displacement of the reading point is minimized as the angular change of the second and third mirrors L2 and L3 is minimized.

Figure 6:
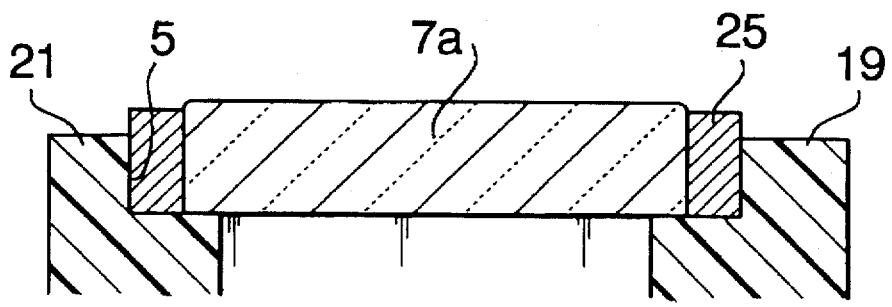
FIG. 6 is an enlarged view of a variation of a cover glass shown in FIG. 2.

FIG. 6 shows a variation of the first embodiment wherein a cover glass plate 7a is set in a metal frame 25, and the frame 25 with the plate 7a is tightly fitted in the seating step 5. This variation behaves mechanically as does the first embodiment, and is thereby also able to reduce the displacement of the reading point.

Thus, the image reading device 1 of the first embodiment permits reducing displacement of the reading point during temperature change without increasing the weight or size of the housing 3.

Figure 7A:
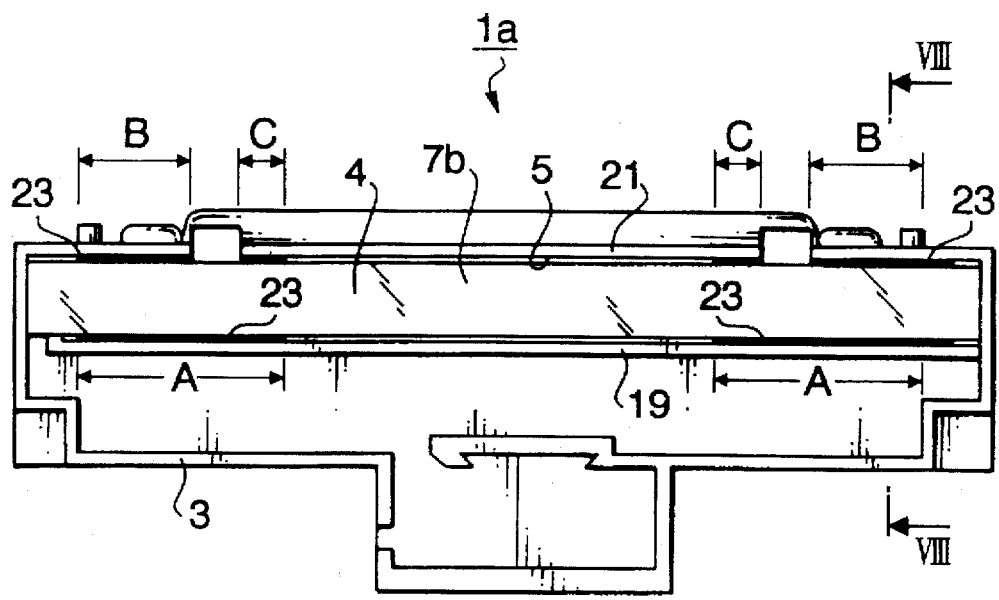
FIGS. 7A and 7B are schematic plan views of the image reading device showing sites for the application of adhesive to the image reading device according to a second embodiment of the invention.
Figure 7B:
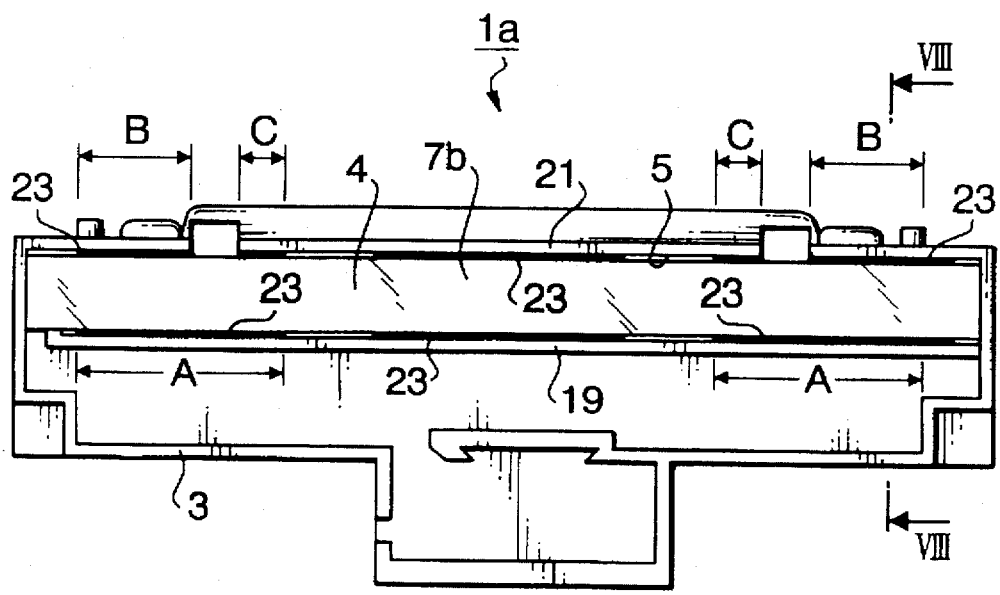

FIGS. 7A and 7B show plan views of an image reading device 1a according to a second embodiment of the invention. The image reading device 1a is similar to that of the first embodiment, and identical elements are given the same reference numerals in this specification. The most significant difference from the first embodiment lies in the form and manner of securing a cover glass plate 7b to the first and second portions 19 and 21 of the housing 3.

In the second embodiment of an image reading device according to the invention, the cover glass plate 7b is narrower along the scanning direction X than the cover glass plate 7 of the first embodiment, and is bonded by an adhesive to the housing 3.

The cover glass plate 7b is sized so as to form gaps between the cover glass plate 7b and the seating step 5 at both sides of the cover glass plate 7b (in scanning direction X). FIG. 7A shows the application sites for adhesive 23 at four sites in the gap between the cover glass plate 7b and the first and second portions 19 and 21 of the housing 3. Portions B and C are considered to be a combined site of application. Preferably, ultraviolet-curing (UV-curing) adhesive is used the adhesive is applied in a pair of portions A for a length of approximately 21 mm each, and in portions B and C for lengths of approximately 11 mm and 5 mm, respectively. FIG. 7B shows the application of adhesive at six sites, the two additional sites being in the center of both sides of the cover glass plate 7b.

Figure 8:
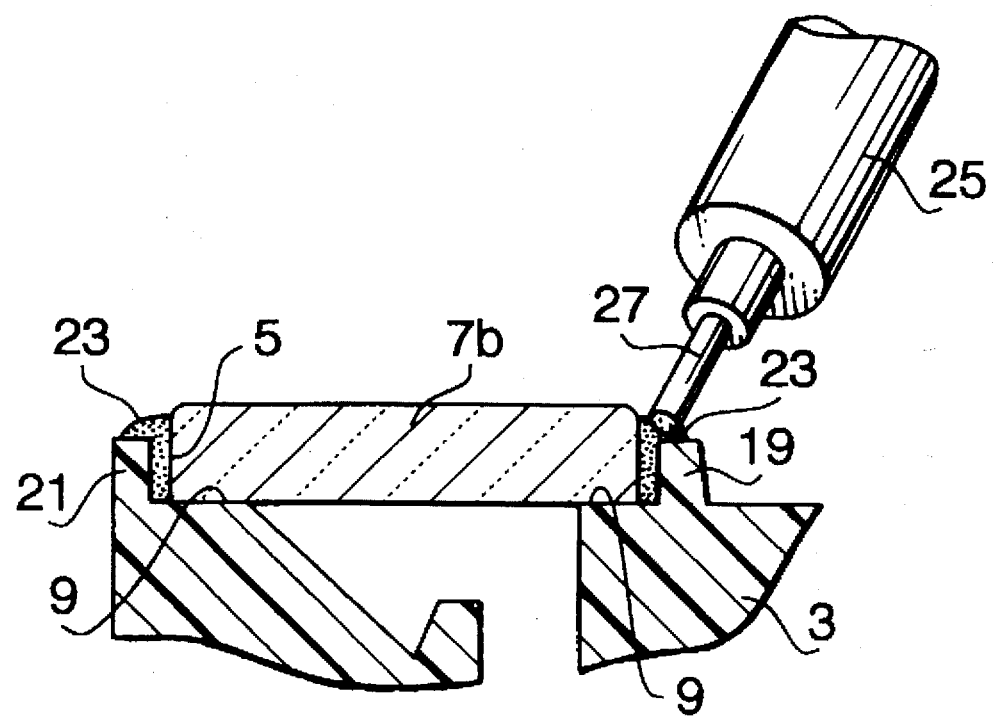
FIG. 8 is an enlarged view of the cover glass of FIG. 2 according to the second embodiment, showing the application of adhesive.

FIG. 8 is an enlarged sectional view, taken along the line VIII—VIII of FIG. 7A or 7B. As shown in FIG. 8, the cover glass plate 7b is set on the seating shelf 9 as shown in FIG. 8, and the adhesive 23 is applied from a needle 27 of a dispenser 25. The gaps are filled by the adhesive The applied adhesive 23 is then cured (if UV-curing adhesive, by illuminating the image reading unit 1 with ultraviolet light). The cover glass plate 7b is thereby fixed to the housing 3, and the first and second portions 19 and 21 of the housing 3 are connected by the cover glass plate 7b so as not to move independently.

The displacement Of the reading point can be reduced, similarly to that of the first embodiment.

In an alternative arrangement, the adhesive 23 may he applied at four points, as previously described. In further alternative arrangements, thread-locking anaerobic adhesive or epoxy resin adhesive may be used in place of the UV-curing adhesive 23. Preferably, the anaerobic adhesive is an anaerobic-curing acrylic adhesive, and the epoxy resin may cure by catalysis, loss of solvent, or other methods.

Three sets of experiments were performed to verify the beneficial effect of the invention.

In a first experiment, angular change of the respective mirrors was measured for compressed (first embodiment) and adhered (second embodiment) cover glass plates versus a reference setup, at temperatures proceeding from 25° C. (room temperature) to 10° C., 0° C., 10° C, 25° C., 45° C. 60° C., 45° C. and again 25° C. The angular displacements were measured in this and the following experiments by reflecting a laser (in this case, a He-Ne laser) from each mirror and calculating the angular displacement from the displacement of the laser beam.

In a second experiment, total displacements of the reading point was directly measured using ten samples of image reading units according to the second embodiment (and alternative arrangements) at temperatures proceeding from 25° C. to 10° C., 0° C., 10° C, 25° C., 45° C., 60° C., 45° C. and finally 25° C. In this and following experiments, the displacements of the reading point were measured using a test pattern that was scanned by the samples of the image reading device 1.

In a third experiment, the angular change of the second and third mirrors L2 and L3 at 0° C. and those at 60° C. were measured using five samples of image reading units according to the second embodiment, and additional comparisons were performed using an additional two samples.

It is estimated that the contribution of the angular displacement of the mirrors L1, L2, and L3 during temperature change accounts for 70% of the resulting displacement in reading point, with the remaining 30% of the reading point displacement being caused by changes in optical properties and position of the lens 15, expansion of the housing 3, displacements of the sensor 17, and other temperature-related changes.

The first experiment was performed using a single sample of an image reading unit, first using a reference example having a cover glass plate unsecured to the first and second portions 19 and 21, and subsequently with cover glass plates 7 or 7b fitted according to the first and second embodiments.

In the reference example, the reference cover glass plate is not tightly fitted in the seating step 5, but a gap exists between the reference cover glass plate and the seating step 5. The reference cover glass plate is attached to the seating shelf 9 by double-sided adhesive tape. Thus, the reference cover glass plate does not restrict the movement or expansion of either of the first portion 19 and the second portion 21 of the housing 3 with reference to each other. Since this reference construction allows the first and the second portions 19 and 21 to deform independently under temperature change, the direction and magnitude of the angular changes of each of the mirrors L2 and L3 can be seen without the beneficial effect of the embodiments of the invention. Accordingly, the reference example provides a basis for comparison to show the beneficial effect of the embodiments of the invention.

Figure 9:
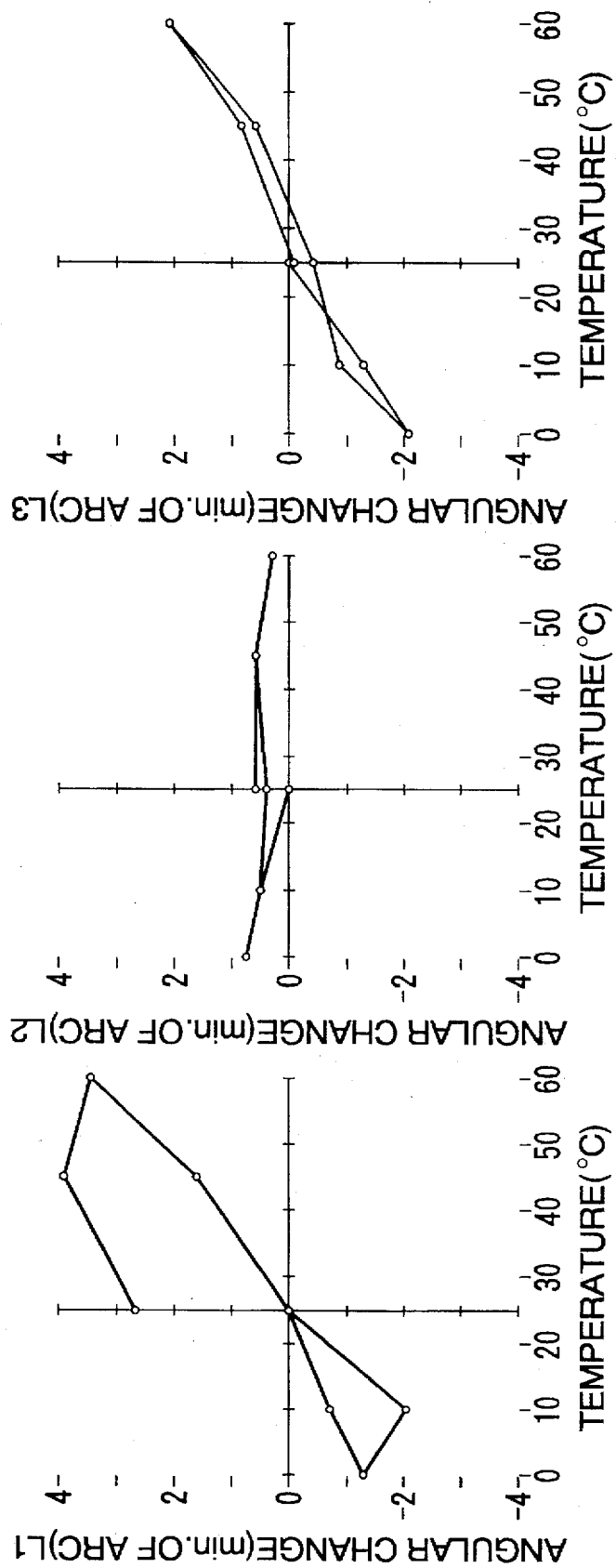
FIGS. 9A through 9C are charts showing angular change versus temperature change for three mirrors, L1, L2, and L3, respectively, in a reference example.

The experimental results for the reference example in the first experiment are shown in FIGS. 9A through 9C. FIGS. 9A through 9C are charts showing angular change versus temperature change for the three mirrors, L1, L2, and L3, respectively. The vertical axes of FIGS. 9A through 9C indicate the angular change of a mirror (in minutes of arc) and the horizontal axes indicate temperature (in C). It should be noted that the axes of the charts in FIGS. 12A through 12C, and 15A through 15C, representing the first and second embodiments, respectively, are similarly arranged.

Figure 10:
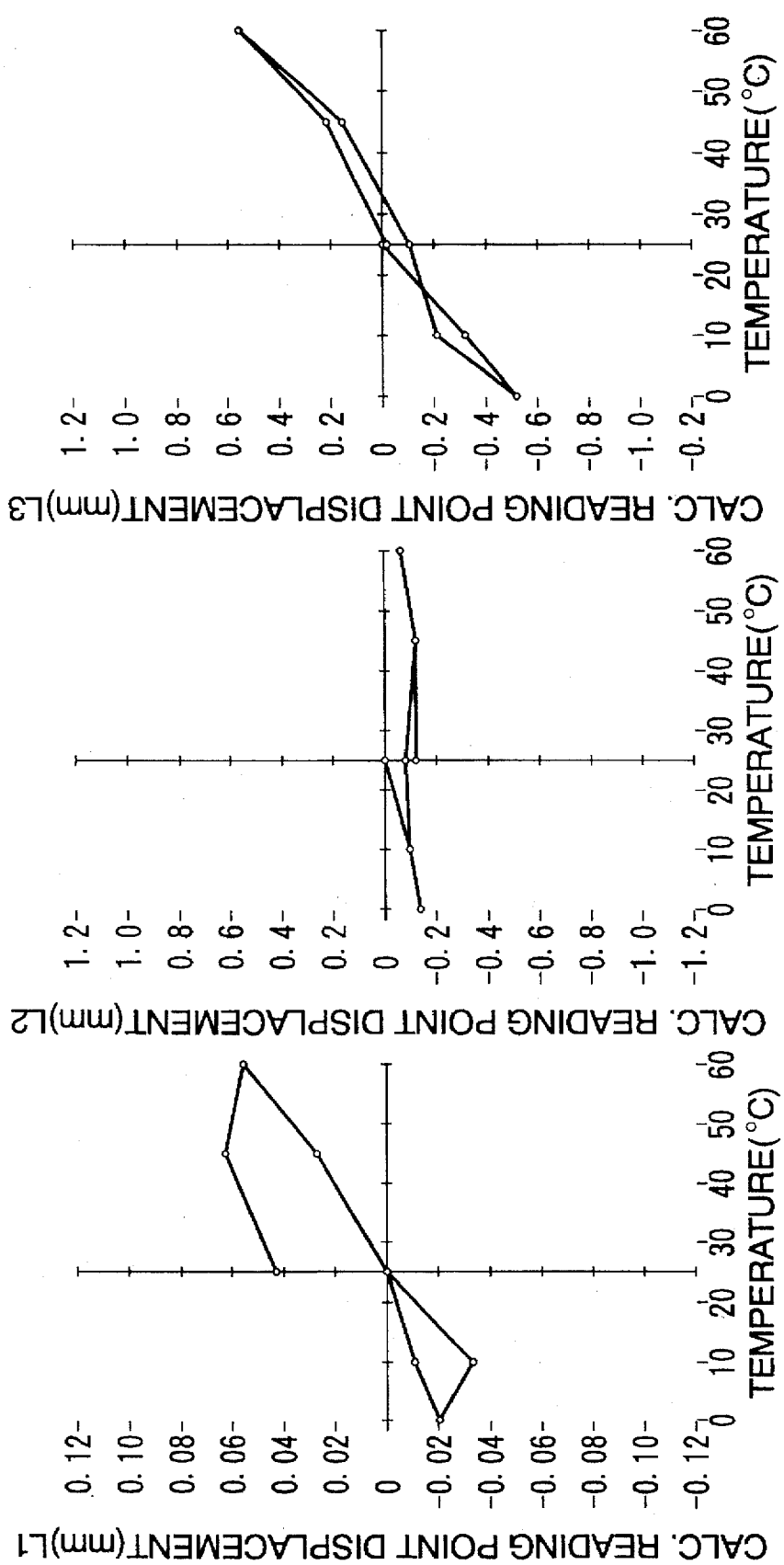
FIGS. 10A through 10C are charts showing the displacement of a reading point on the cover glass versus ten stature change, calculated based of the data of FIGS. 9A through 9C, respectively.
Figure 11:
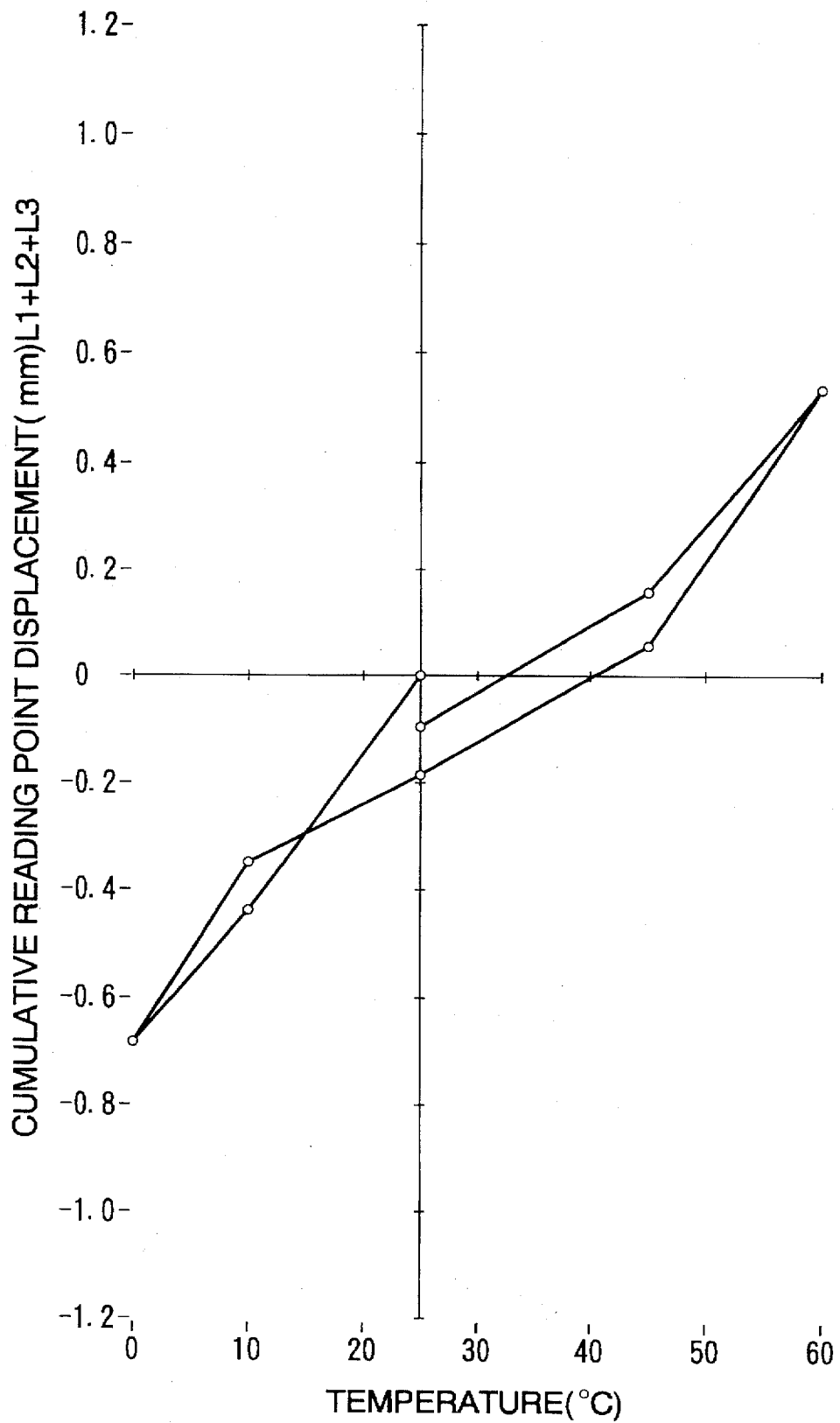
FIG. 11 is a chart showing cumulative displacement of the reading point according to the data of FIGS. 10A through 10C.

On the basis of the experimental results for the first experiment, the displacement of the reading point due to the angular change of the respective mirrors were calculated according to the relations (1), (2), and (3) previously described, and the cumulative displacement of the reading point was calculated by summing the respective calculated displacements. FIGS. 10A through 10C show the calculated displacement of the reading point (in the scanning direction X) versus temperature change, corresponding to FIGS. 9A through 9C, respectively, while FIG. 11 shows calculated cumulative displacement of the reading point for all three mirrors. The vertical axes of FIGS. 10A through 10C and FIG. 11 indicate the displacements of the reading points (in mm) and the horizontal axes indicate temperature (in °C). It should be noted that the axes of the charts in FIGS. 13A through 13C and 14, representing the first embodiment, and FIGS. 16A through 16C and 17, representing the second embodiment, are similarly arranged.

Although the angular change of the first mirror L1 is relatively large as shown in FIG. 9A, the resulting displacement of the reading point is relatively small, as shown in FIG. 10A. Accordingly, since the sensitivity of the first mirror L1 is smaller than the second and third mirrors L2 and L2, the scale of the vertical axis in FIG. 10A is an order of magnitude less than of those of FIGS. 10B and 10C.

The experimental results for the reference example in the first experiment are used in comparison wish the experimental results for the first and second embodiments.

Figures 12A, 12B, 12C:
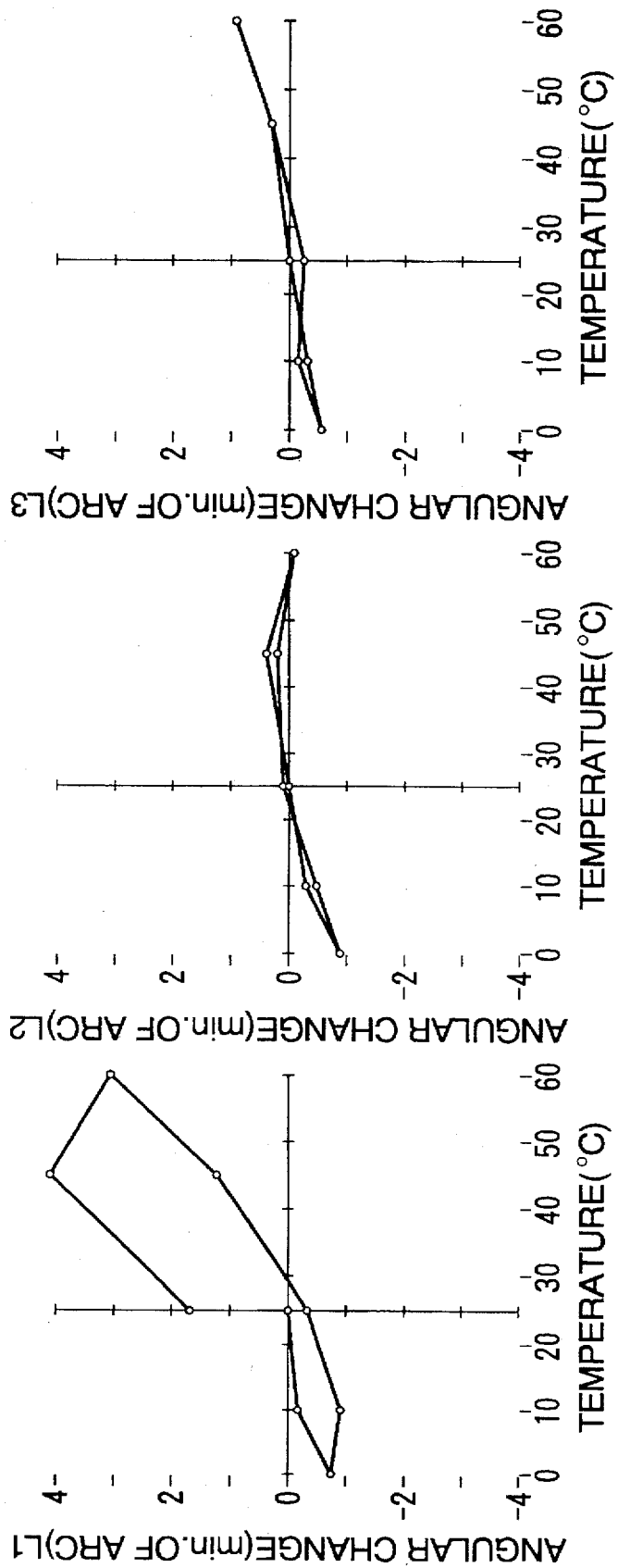
FIGS. 12A through 12C are charts showing angular change versus temperature change for three mirrors, L1, L2, and L3, respectively, in a first embodiment of a reading device.
Figure 14:
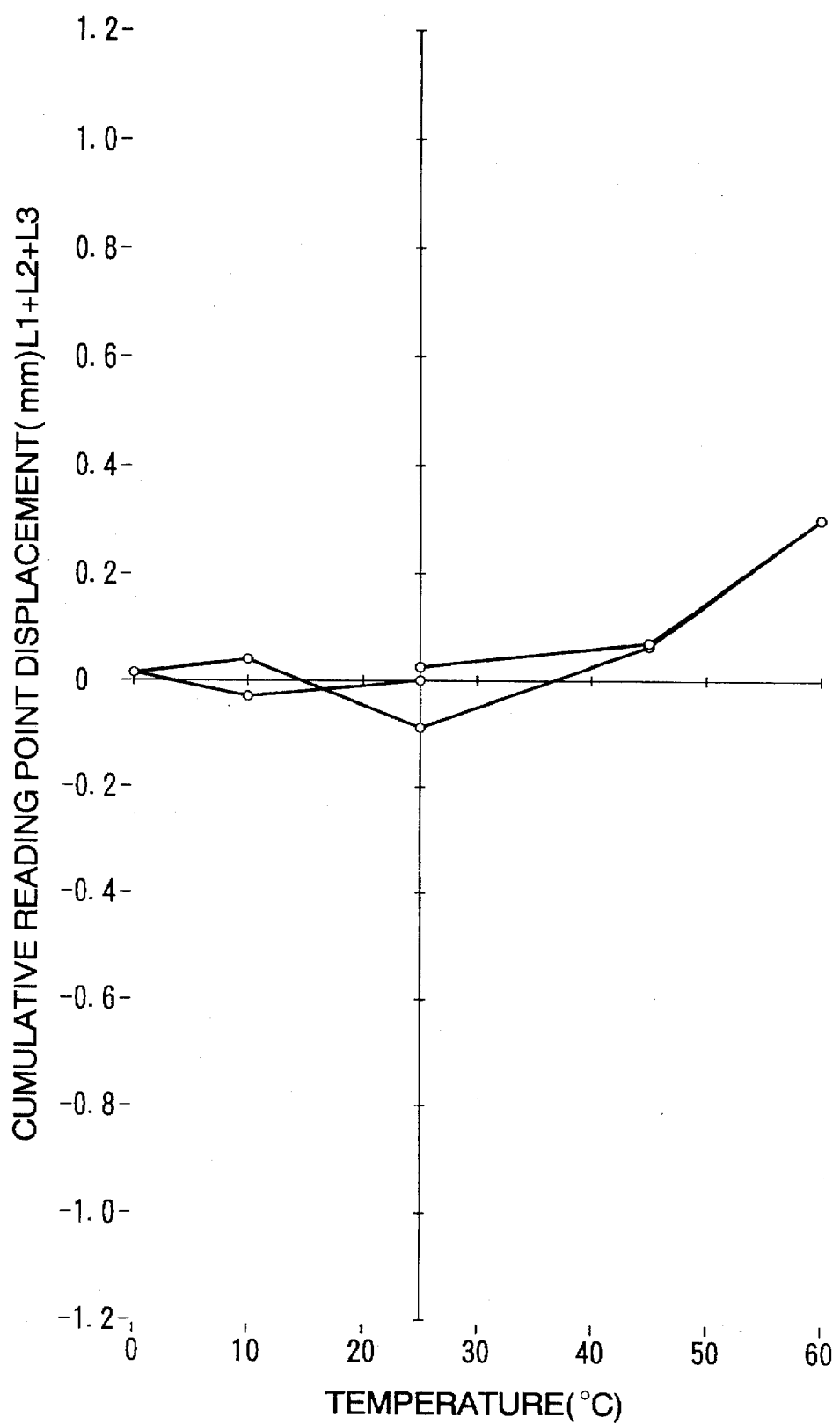
FIG. 14 is a chart showing cumulative displacement of the reading point according to the data of FIGS. 13A through 13C.

The experimental results for the first experiment using a reading unit according to the first embodiment are shown in FIGS. 12A through 12C. As previously described, in the first embodiment, the cover glass plate 7 is tightly fitted in the seating step 5, inducing compressive stress in the first and second portions 19 and 21. FIGS. 13A through 13C show calculated displacements of the reading points along the scanning direction X, and FIG. 15 shows the calculated cumulative displacement of the reading point.

As shown in FIGS. 12A through 12C, in the first experiment using a reading unit according to the first embodiment, the angular change of the second and third mirrors L2 and L3 was in a similar direction versus temperature change, and had similar absolute amounts at each tested temperature. However, in comparison, for the reference example shown in FIGS. 9A through 9C, although the angular changes of the second and third mirrors L2 and L3 were in a similar direction versus temperature change, the absolute amount of change of the third mirror L3 was much higher than that of the second mirror L2.

As previously noted, the sensitivity of the third mirror L3 is the largest of the three mirrors. Accordingly, the large angular change in the reference example causes a large displacement of the reading point. It can be seen by comparing FIGS. 13A through 13C with FIGS. 10A through 10C that although the displacements of the reading point for each of the first and second mirrors L1 and L2 were similar in direction and magnitude for both the reference example and the first embodiment, the displacement for the third mirror L3 was significantly lower in the first embodiment. Comparing the cumulative displacement of the reading points, in the first experiment using a reading unit according to the first embodiment (shown in FIG. 14), the cumulative displacement varied within a range of about 0.4 mm, while in the reference example (shown in FIG. 11), the cumulative displacement varied within a range of about 1.2 mm.

It can be hypothesized that in the first embodiment, the first portion 19 and second portion 21 are deformed together with each other as the temperature changes. Furthermore, since the angular changes of the second and third mirrors L2 and L3 in the same direction displace the reading points in opposite directions with each other as shown in FIGS. 13B and 13C, as the magnitude of the displacement generated by the third mirror L3 approaches that generated by the second mirror L2, the respective displacements can be counterbalanced.

Figures 15A, 15B, 15C:
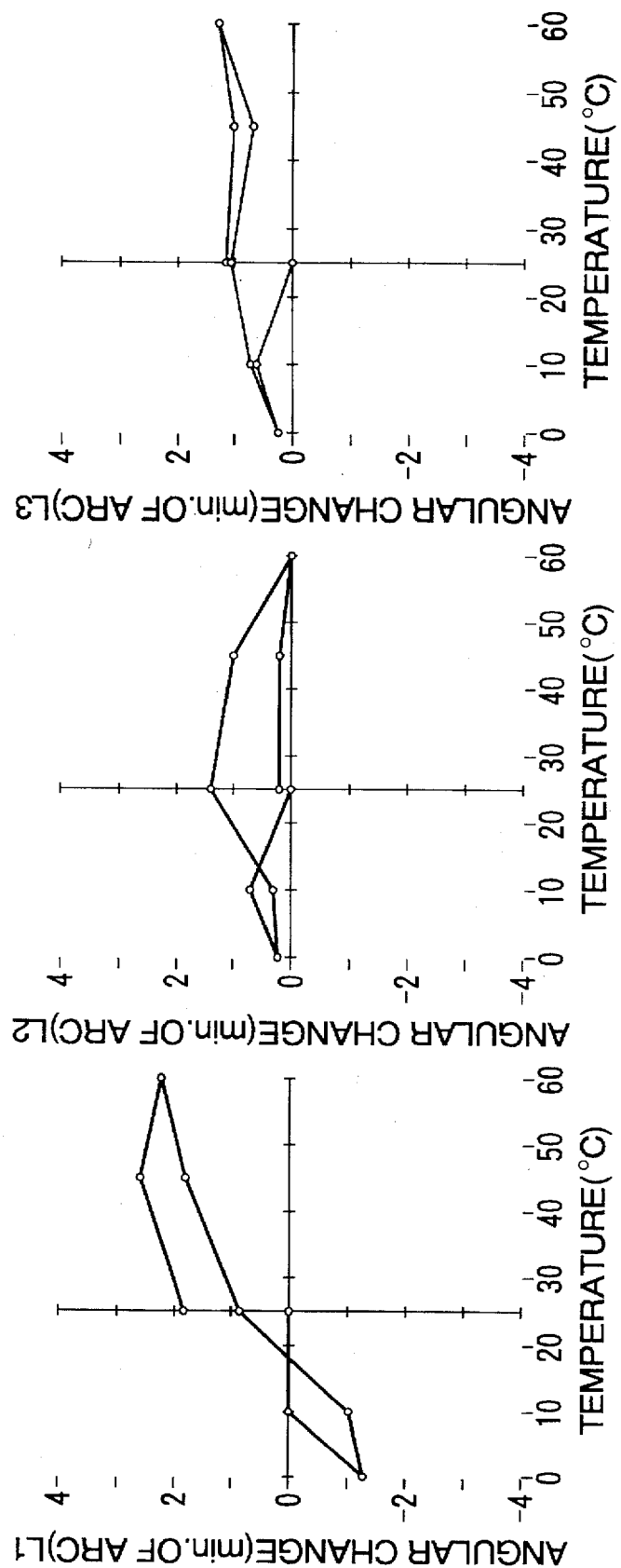
FIGS. 15A through 15C are charts showing angular change versus temperature change for three mirrors, L1, L2, and L3, respectively, in a second embodiment of a reading device.
Figure 17:
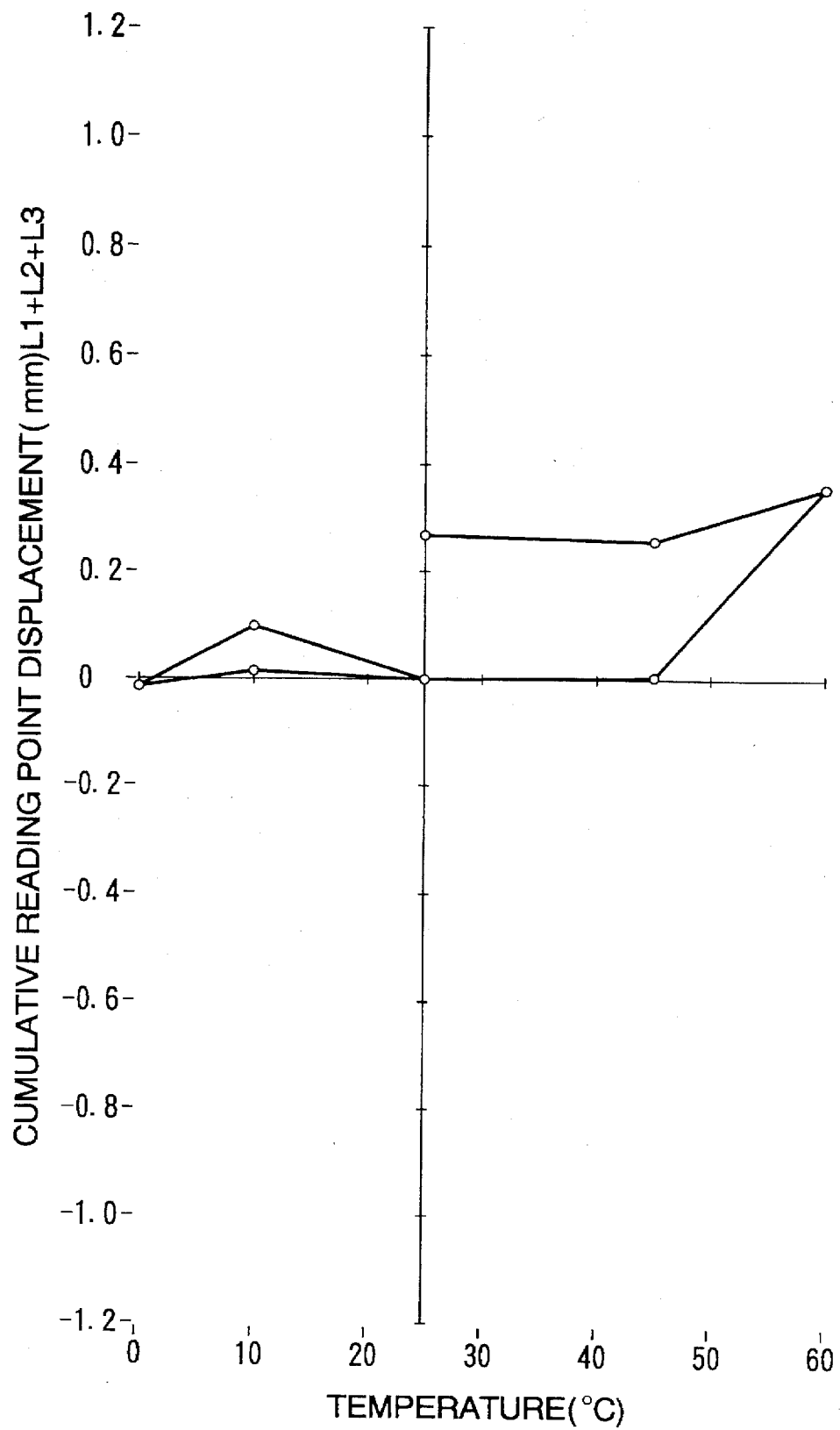
FIG. 17 is a chart showing calculated cumulative displacement of the reading point according to the data of FIGS. 16A through 16C.

The experimental results for the second embodiment of the invention in the first experiment are shown in FIGS. 15A through 15C. As previously described, in the second embodiment, a cover glass plate 7b is shaped to fit in the seating step 5 and to form gaps between the cover glass plate 7b and the first and second portions 19 and 21, and the cover glass plate 7b is affixed to the first and second portions 19 and 21 with an adhesive. FIGS. 16A through 16C show calculated displacements of the reading points along the scanning direction X, and FIG. 17 shows the calculated cumulative displacement of the reading point.

As shown in FIGS. 16A through 16C, in the first experiment using a reading unit according to the second embodiment, the angular change of the second and third mirrors L2 and L3 were in a similar direction versus temperature change, and had similar absolute amounts at each tested temperature. Similarly to the first embodiment, it can be seen by comparing FIGS. 15A through 15C with FIGS. 10A through 10C that although the displacements of the reading point for each of the first and second mirrors L1 and L2 were similar in direction and magnitude for both the reference example and the second embodiment, the displacement for the third mirror L3 was significantly lower in the second embodiment comparing the cumulative displacement of the reading points, in the second embodiment (shown in FIG. 17), the cumulative displacement varied within a range of about 0.4 mm, while in the reference example (shown in FIG. 11), the cumulative displacement varied within a range of about 1.2 mm.

It can be hypothesized that similar to the first embodiment, in the second embodiment the first portion 19 and second portion 21 are deformed together with each other as the temperature changes. Furthermore, since the angular changes of the second and third mirrors L2 and L3 in the same direction displace the reading points in opposite directions with each other as shown in FIGS. 16B and 16C, as the magnitude of the displacement generated by the third mirror L3 approaches that generated by the second mirror L2, the respective displacements can be counterbalanced.

On the basis of the first experiment, it was found that either of the first and second embodiments reduces the displacement of the reading point caused by the third mirror L3 and the cumulative displacement of the reading point as the temperature changes. That is, the fixing of the first and second portions 19 and 21 of the housing 3 by the cover glass plate 7 is effective to reduce the displacement of the reading point, and permits the CCD sensor 17 to scan an image throughout a wide temperature range.

FIGS. 18 through 27 show the results of the second experiment, in which the actual displacement of the reading point was measured along the scanning direction X using ten samples of an image reading unit according to the second embodiment. The second experiment focused on examining the effect of the adhesive type and the method of adhesive application (specifically the number of application sites).

The experimental matrix of the second experiment is summarized in Table 2. In the Table 2, ten samples S1 through S10 are shown, and the Figure or Figures herein relating to a particular sample is noted. The cumulative displacement of the reading point was measured for each of the samples S2 through S6 before and after adhesion, as shown by "N" (before) and "Y" (after) in the BOND? column. The type of adhesive is noted in the ADHESIVE column, with UV denoting ultraviolet-curing adhesive, ACRYLIC denoting anaerobic acrylic (thread-locking) adhesive, and EPOXY denoting an epoxy resin adhesive. The SITES column shows the number of sites at which adhesive was applied. Lastly, a representative change Δ in the displacement of the reading point, being the difference of maximum and minimum displacements (i.e., the width of the range of displacements) measured between 0° C. and 60° C., is shown.

TABLE 2

| SAMPLE | FIG. | BOND? | ADHESIVE | SITES | Δ (mm) |
| --- | --- | --- | --- | --- | --- |
| S1  | 18  | Y | UV      | 6 | 0.43 |
| S2' | 19A | N | —       | — | 1.59 |
| S2  | 19B | Y | UV      | 6 | 0.57 |
| S3' | 20A | N | —       | — | 1.71 |
| S3  | 20B | Y | UV      | 4 | 0.44 |
| S4' | 21A | N | —       | — | 1.01 |
| S4  | 21B | Y | UV      | 4 | 0.44 |
| S5' | 22A | N | —       | — | 1.45 |
| S5  | 22B | Y | UV      | 4 | 0.20 |
| S6' | 23A | N | —       | — | 1.29 |
| S6  | 23B | Y | UV      | 4 | 0.45 |
| S7  | 24  | Y | ACRYLIC | 4 | 1.00 |
| S8  | 25  | Y | ACRYLIC | 4 | 0.98 |
| S9  | 26  | Y | EPOXY   | 4 | 0.77 |
| S10 | 27  | Y | EPOXY   | 4 | 1.10 |

Samples S2 through S6 are noted as S2 through S6, respectively, before adhesion. As shown in Table 2, the cover glass plates 7b of the samples S1 and S2 were bonded by UV adhesive at six points, and the cover glass plates 7b of the samples S3 through S6 by UV adhesive at four points. The cover glass plates 7b of the samples S7 and S8 were bonded by anaerobic acrylic adhesive at four points, and finally, the cover glass plates of the samples S9 and S10 were bonded by epoxy resin at four points.

In FIGS. 18 through 27, the vertical axes indicate the total observed displacement of the reading points (in mm) projected to the cover glass plate and the horizontal axes indicate temperature (in °C.). White circles indicate the displacements of the reading point taken at a position 70 mm right (from the viewpoint of FIG. 7) from the center (along the optical axis K) in a direction perpendicular to the scanning direction X, and are labeled "L70". Black circles indicate the displacements of the reading point taken at a position 70 mm left (from the viewpoint of FIG. 7) from the center in a direction perpendicular to the scanning direction X, and are labeled "R70".

Figure 24:
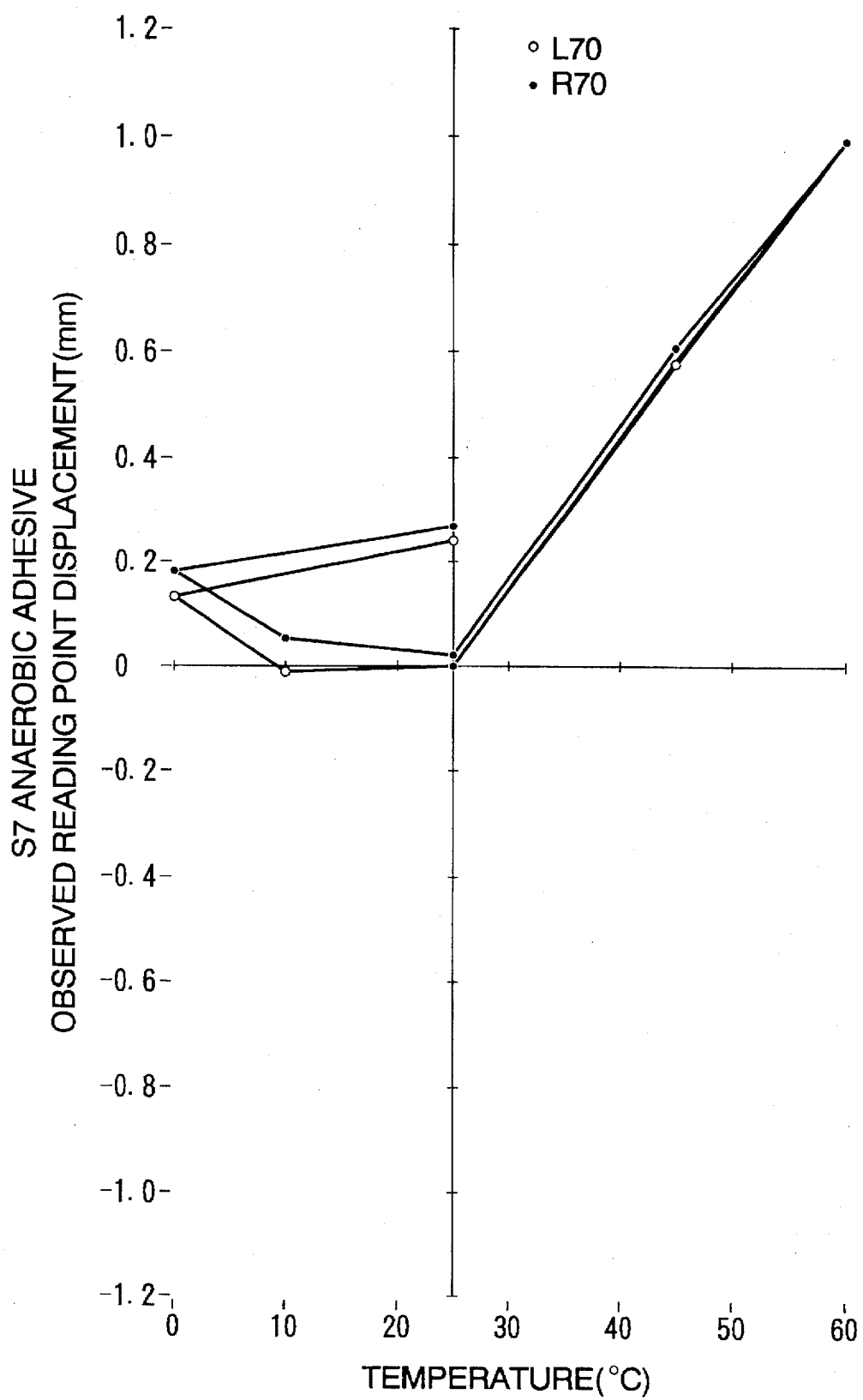
FIG. 24 is a chart showing observed total reading point displacement versus temperature change of a seventh experimental sample according to the second embodiment.
Figure 25:
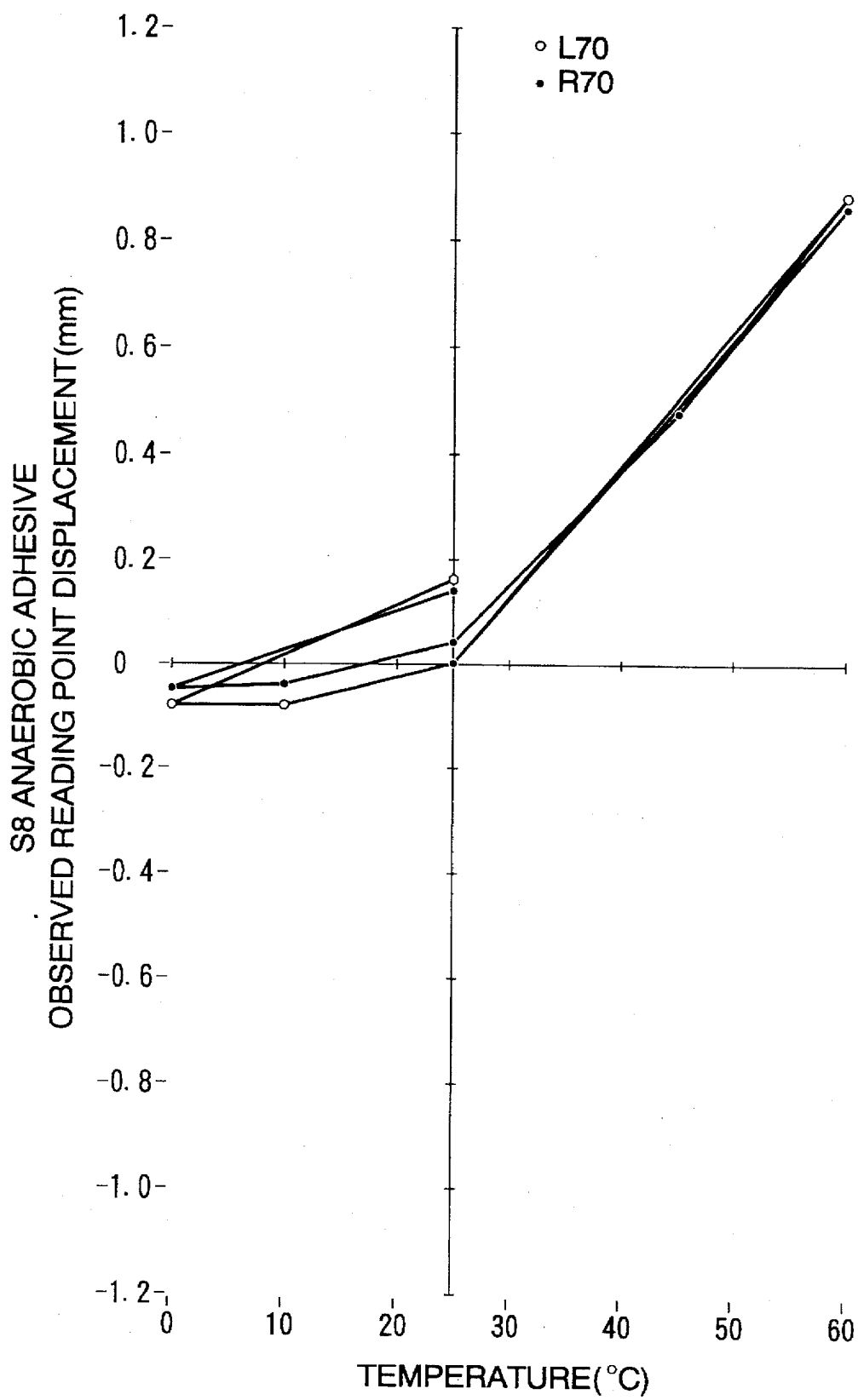
FIG. 25 is a chart showing observed total reading point displacement versus temperature change of an eighth experimental sample according to the second embodiment.
Figure 26:
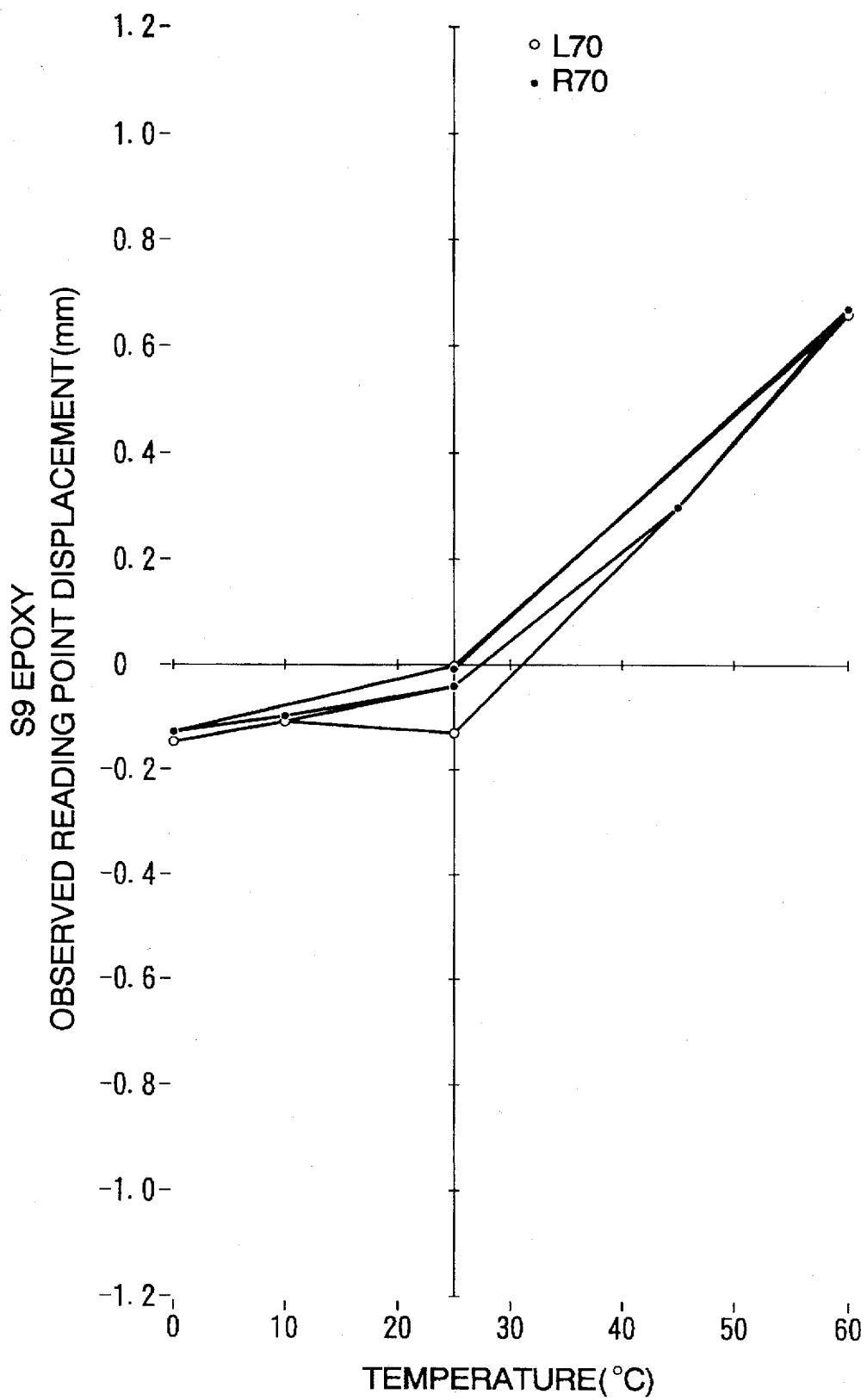
FIG. 26 is a chart showing observed total reading point displacement versus temperature change of a ninth experimental sample according to the second embodiment.
Figure 27:
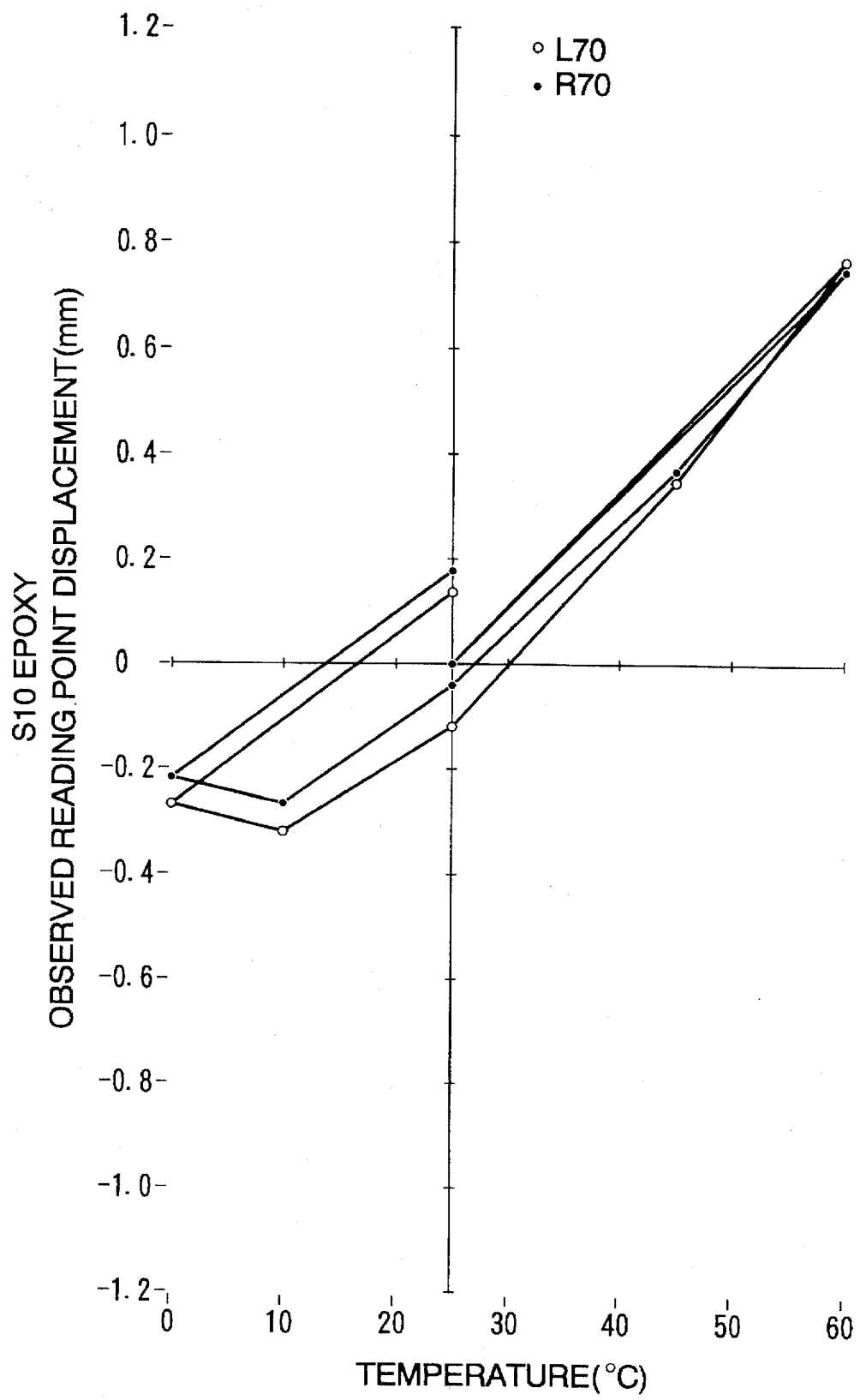
FIG. 27 is a chart showing observed total reading point displacement versus temperature change of a tenth experimental sample according to the second embodiment.

The relative merits of the various adhesives were compared with 4-point adhesion samples S3 through S10. UV-curing adhesive was contrasted with anaerobic acrylic and epoxy resin adhesives by comparing UV-curing samples S3 through S6 (as shown in FIGS. 20B, 21B, 22B, and 23B) with anaerobic acrylic samples S7 and S8 (as shown in FIGS. 24 and 25) and epoxy resin samples S9 and S10 (as shown in FIGS. 26 and 27). It can be seen that the UV adhesive, having a change in total reading point displacement a Δ ranging between 0.20 mm and 0.57 mm, appears generally superior to both the anaerobic acrylic adhesive, having a change in total reading point displacement Δ ranging between 0.98 mm and 1.00 mm, and the epoxy resin adhesive, having a change in total reading point displacement Δ ranging between 0.77 mm and 1.10 mm. In the samples using the anaerobic acrylic (shown in FIGS. 24 and 25) or epoxy resin adhesives (shown in FIGS. 26 and 27), the total reading point displacement increased in the high temperature region. It can be hypothesized that the quality of the anaerobic acrylic or epoxy resin adhesives are compromised at high temperatures, possibly due to high-temperature creep.

In a second portion of the second experiment, as previously performed for the reference example in the first experiment, the change in cumulative displacement Δ was compared before and after adhesion. This comparison was performed with 4-point adhesion UV-curing samples S2 through S6 with the same samples (S2 through S6) before adhesion. As shown by comparing FIG. 19A with 19B, 20A with 20B, 21A with 21B, 22A with 22B, and 23A with 23B, it can be seen that the displacements after adhesion ranged from 14% to 44% of those before adhesion.

Figure 18:
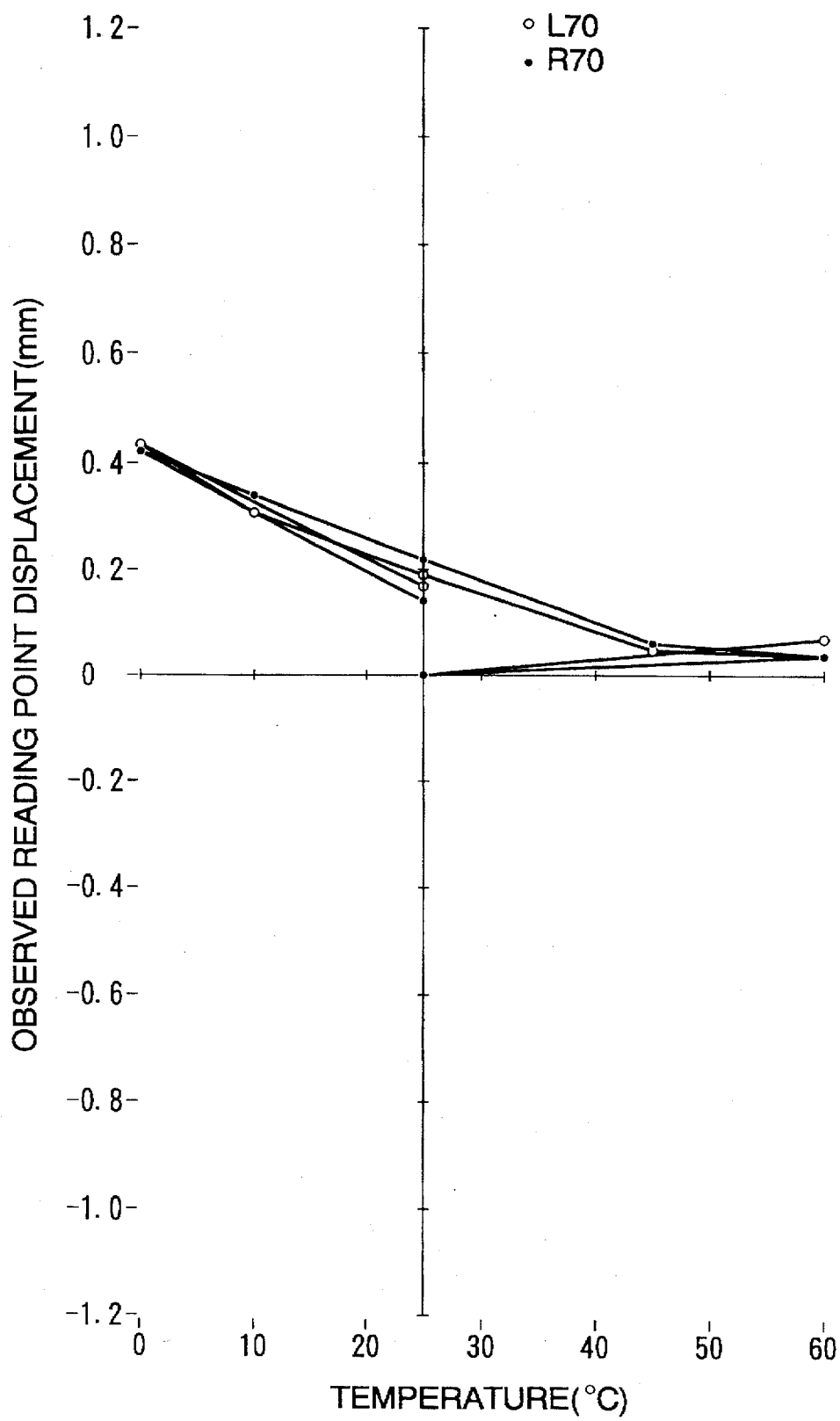
FIG. 18 is a chart showing observed total reading point displacement versus temperature change of a first experimental sample according to the second embodiment.
Figure 19B:
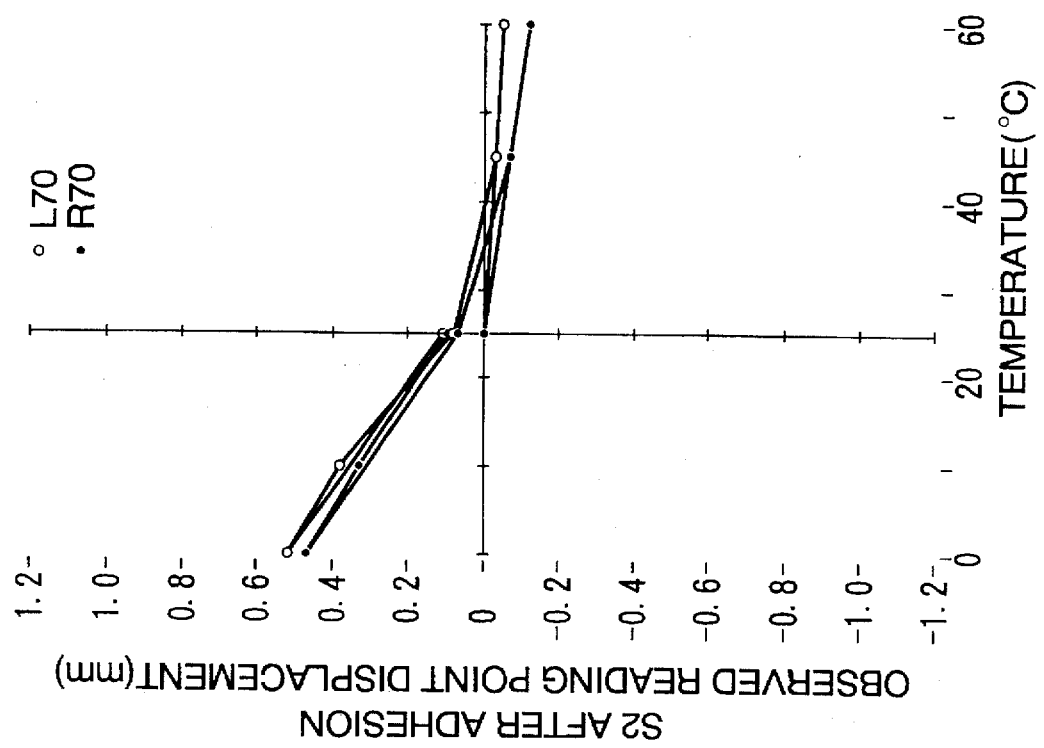
FIGS. 19A and 19B are charts showing observed total reading point displacement versus temperature change, preceding and following the application of adhesive, respectively, for a .second experimental sample according to the second embodiment.
Figure 19A:
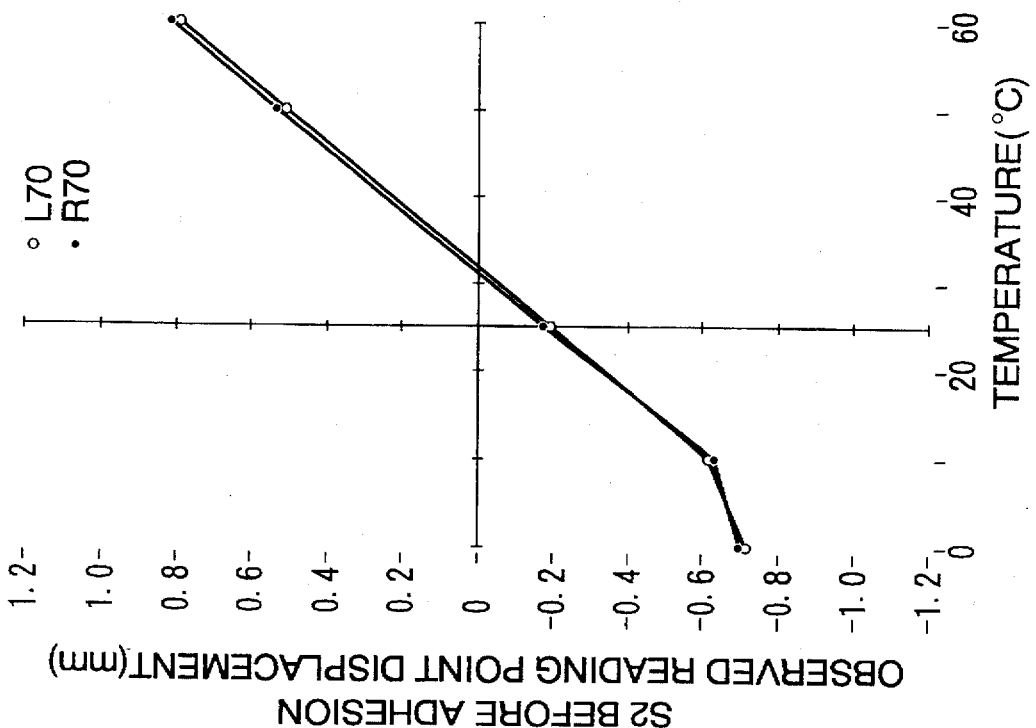
Figure 20B:
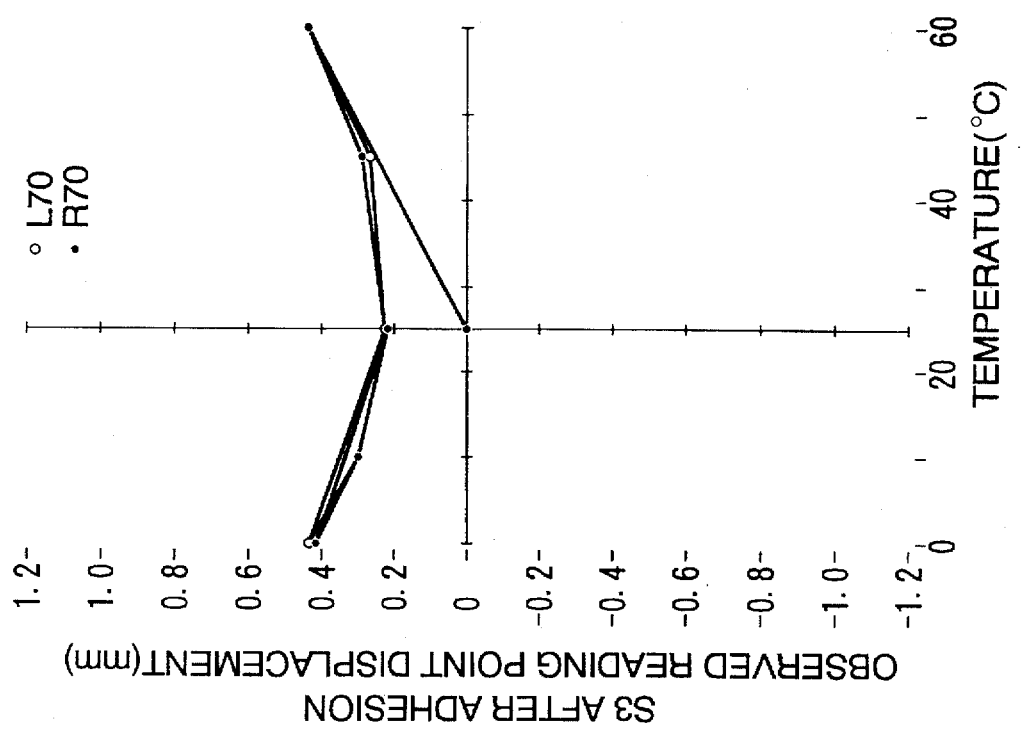
FIGS. 20A and 20B are charts showing observed total reading point displacement versus temperature change, preceding and following the application of adhesive, respectively, for a third experimental sample according to the second embodiment.
Figure 20A:
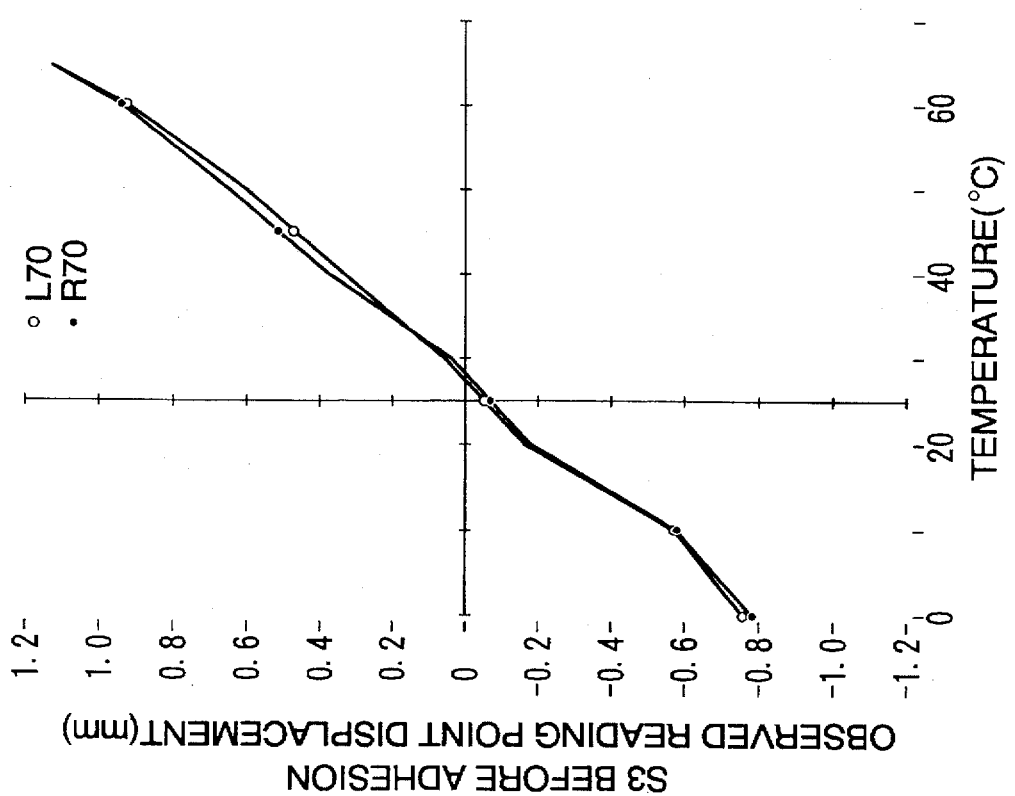
Figure 21B:
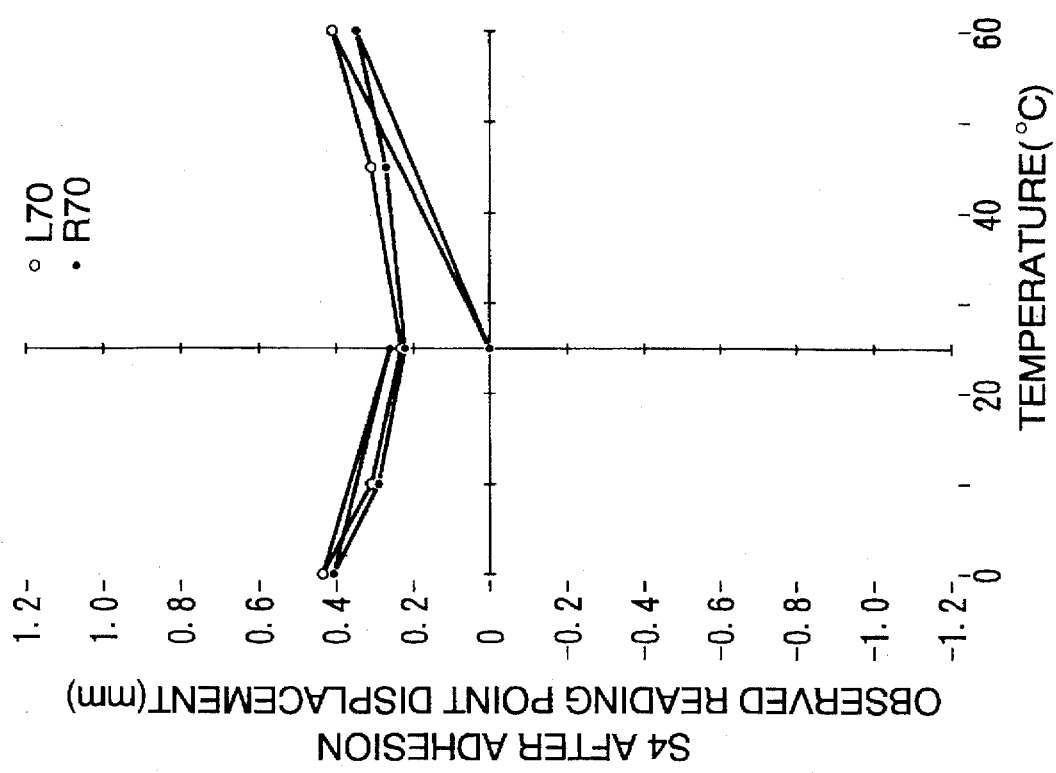
FIGS. 21A and 21B are charts showing observed total reading point displacement versus temperature change, preceding and following the application of adhesive, respectively, for a fourth experimental sample according to the second embodiment.
Figure 21A:
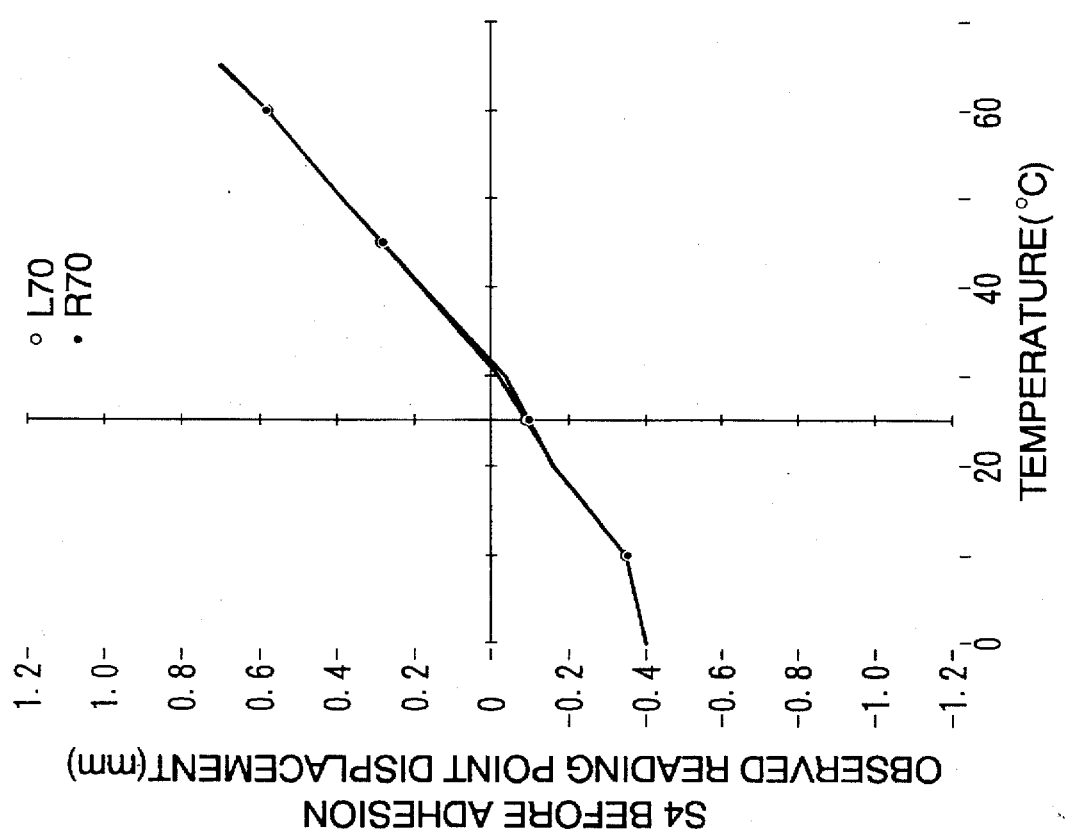
Figure 22B:
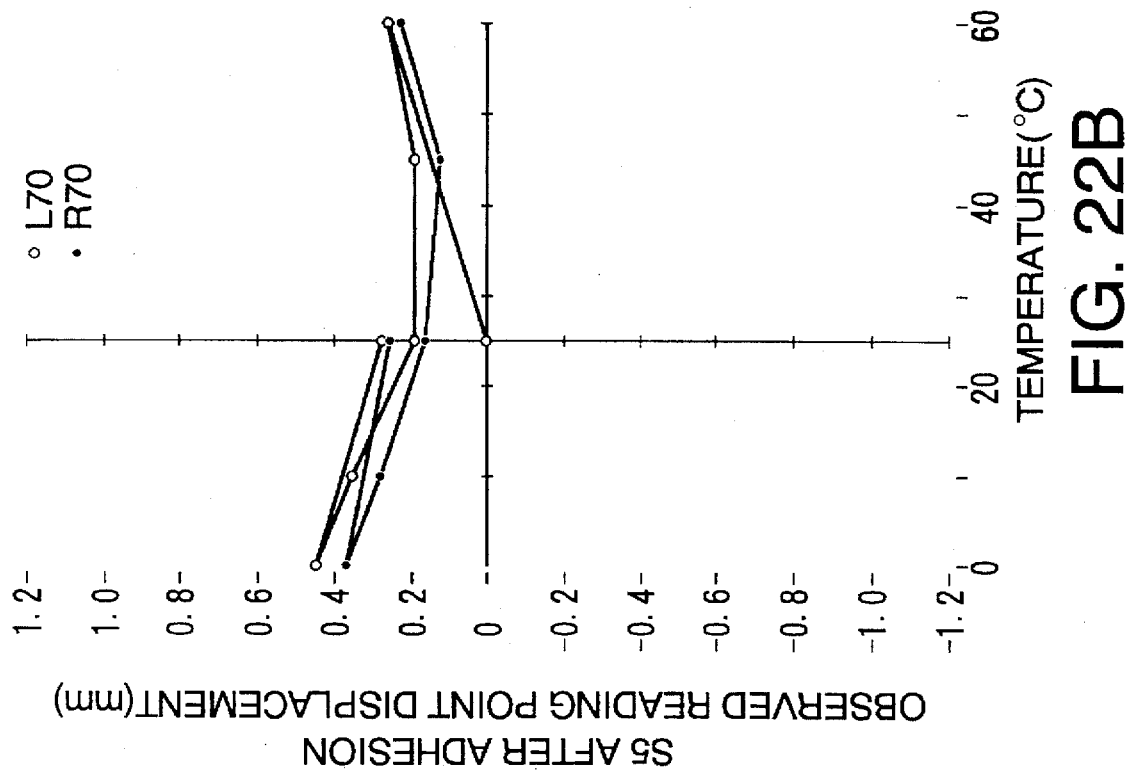
FIGS. 22A and 22B are charts showing observed total reading point displacement versus temperature change, preceding and following the application of adhesive, respectively, for a fifth experimental sample according to the second embodiment.
Figure 22A:
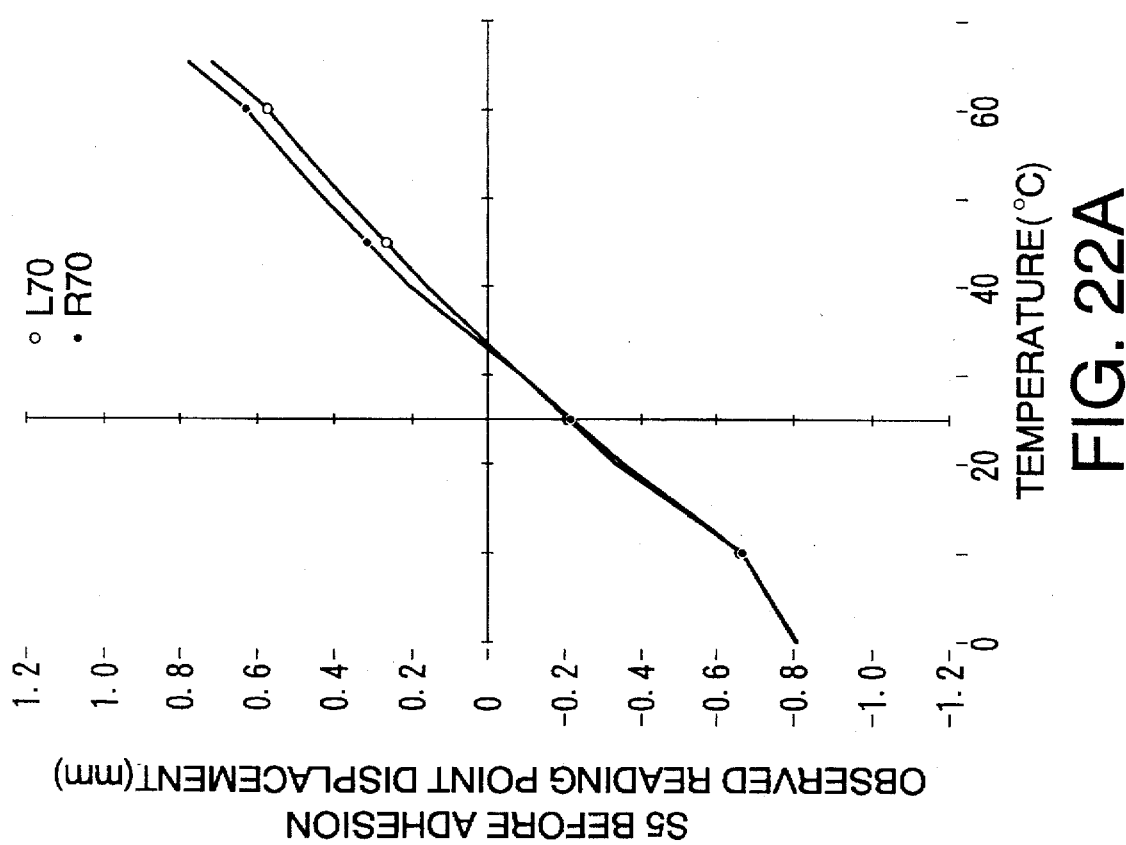
Figure 23B:
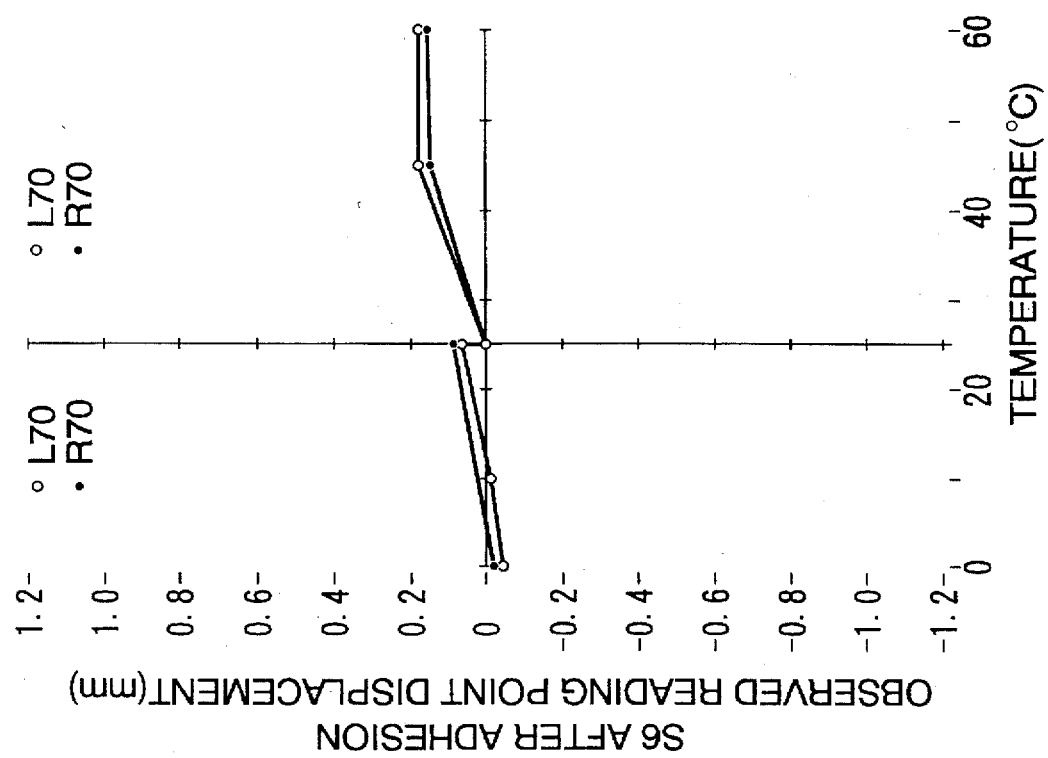
FIGS. 23A and 23B are charts showing observed total reading point displacement versus temperature change, preceding and following the application of adhesive, respectively, for a sixth experimental sample according to the second embodiment.
Figure 23A:
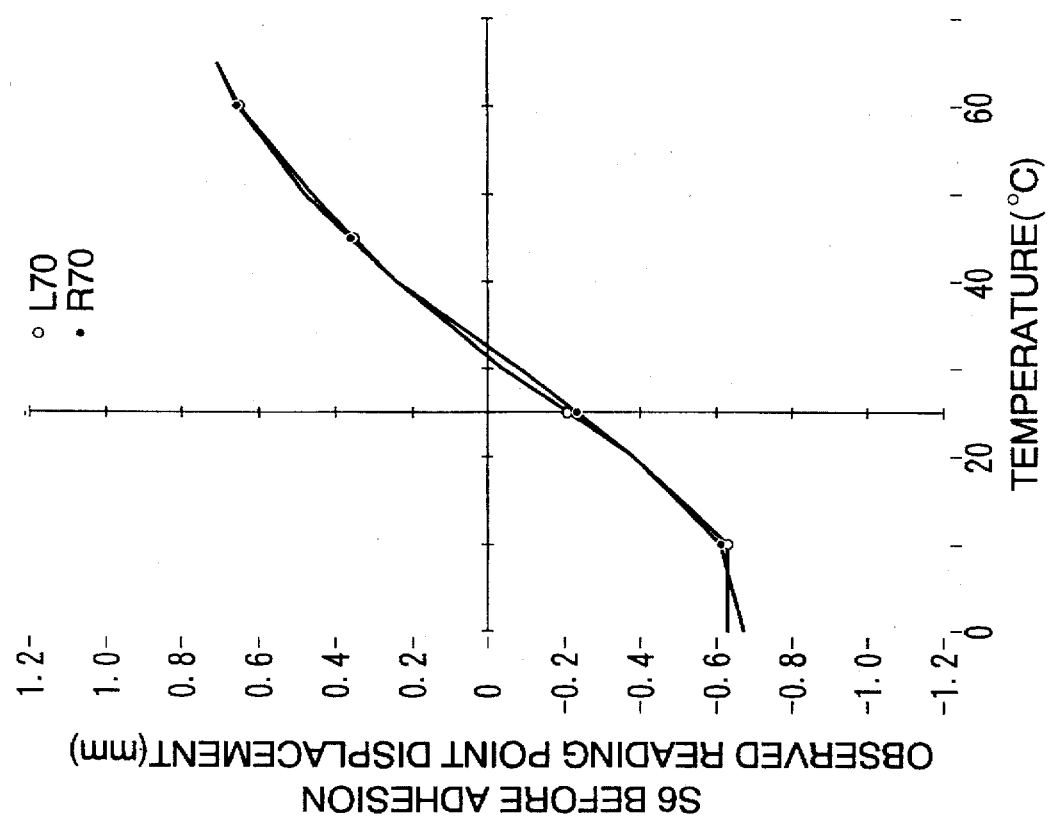

Lastly, in a third portion of the second experiment, the relative merits of the adhesion method, specifically the number of adhesion sites, was compared using the 6-point UV-curing adhesive samples S1 and S2 (as shown in FIGS. 18 and 19B) with the 4-point adhesion UV-curing adhesive samples S3 through S6 (as shown in FIGS. 20B, 21B, 22B, and 23B). The reading points of the 6-point adhesion samples showed a change in cumulative displacement Δ ranging from 0.43 mm to 0.57 mm, while the reading points of the 4-point adhesion samples S3 through S6 showed a change in cumulative displacement Δ ranging between 0.29 mm to 0.45 mm. Furthermore, the 6-point adhesion samples S1 and S2 showed a reduction in displacement in the high temperature range, but had a relatively large cumulative displacement near room temperature range, while the 4-points adhesion samples S3 through S6 showed a relatively low cumulative displacement at both room and high temperature ranges.

Thus, according to the results of the second experiment, the preferred development of the second embodiment of the invention utilizes a cover glass plate 7b bonded to the first and second portions 19 and 21 by a UV-curing adhesive at four sites.

FIGS. 28 through 32 show the results of the third experiment, in which the relation of the angular changes in the second and third mirrors was examined for five samples of image reading units according to the second embodiment. Specifically, five samples having cover glass plates 7b adhered by UV-curing adhesive at four sites, as previously described, were measured. In the third experiment, measurements of the difference in angular change for the mirrors L1, L2 and L3 between 0° C. and 60° C. was measured, before and after adhesion, for samples S2, S5, and S6 of the second experiment, and an additional two samples designated S11 and S12. The samples S2, S5, S6, S11, and S12 are designated, respectively, S2', S5', S6', S11', and S12' before adhesion. Furthermore, the total observed reading point displacement was measured before and after adhesion for each of the five samples S2, S5, S6, S11, and S12.

Figure 28:
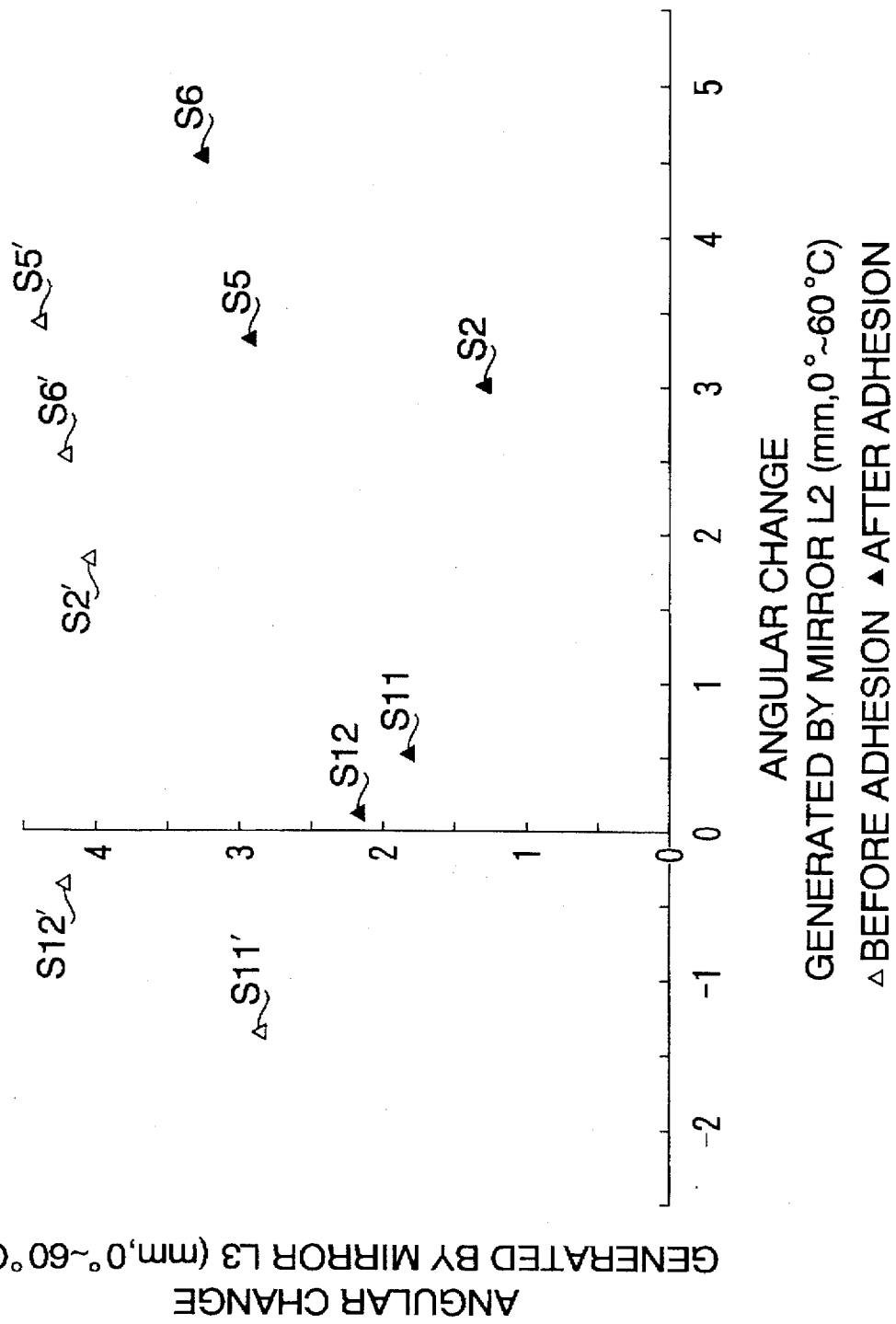
FIG. 28 is a chart showing angular change of a second mirror versus a third mirror, preceding and following the application of adhesive, for the second through sixth experimental samples according to the second embodiment.
Figure 29:
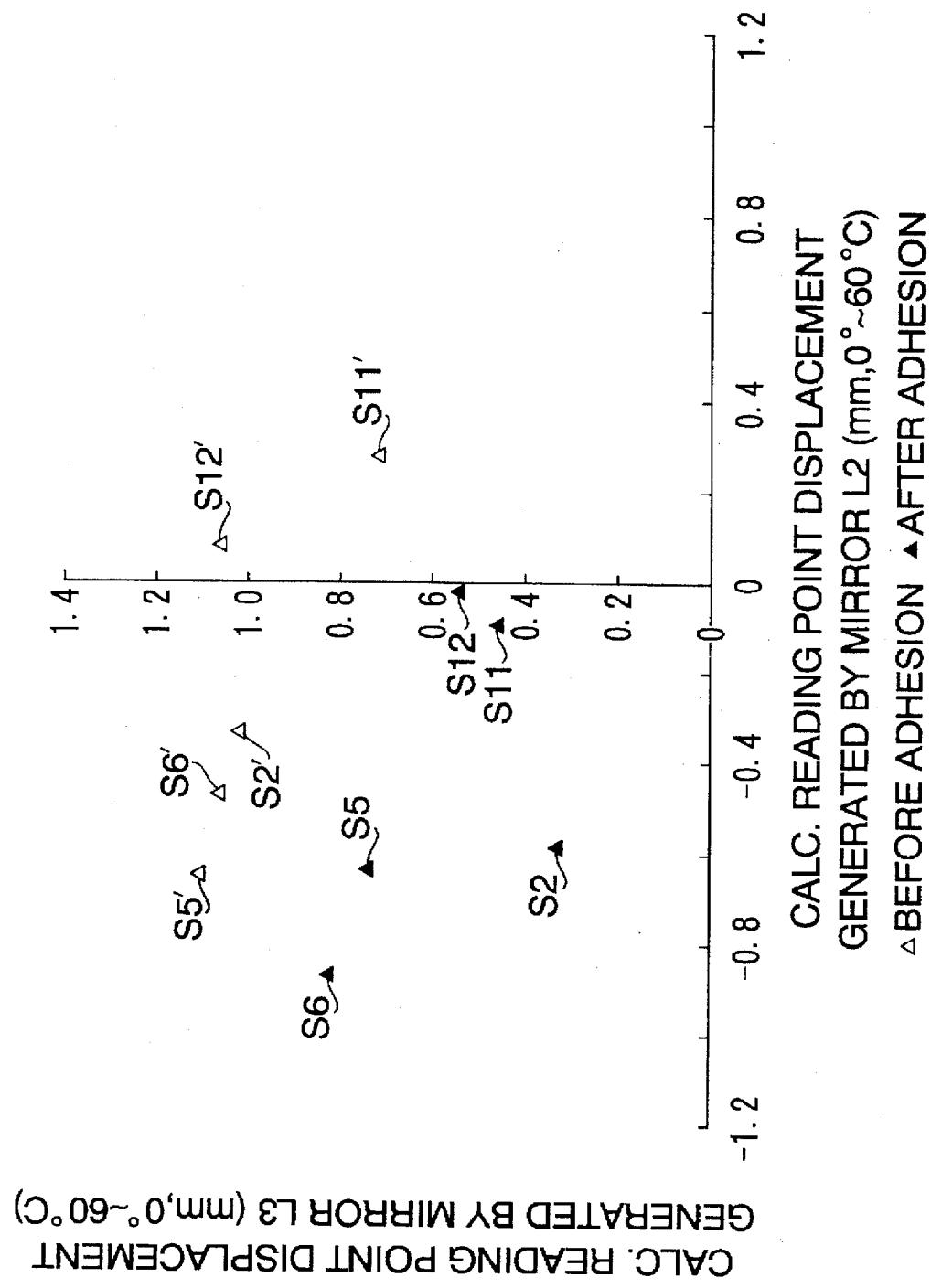
FIG. 29 is a chart showing calculated reading point displacement of a second mirror versus a third mirror, preceding and following the application of adhesive, for the second through sixth experimental samples according to the second embodiment, calculated based on the data of FIG. 28.

FIG. 28 is a chart of the results of measurements in difference in angular change between 0° C. and 60° C., showing the difference in angular change of the second mirror L2 versus that of the third mirror. FIG. 29 is a chart of calculated displacements of the reading point as calculated from the data of FIG. 28 according to the relations (2) and (3) previously described, showing the difference in reading point displacement generated by the second mirror L2 versus that generated by the third mirror L3.

In FIG. 28, the vertical axis indicates the angular change of the third mirror L3 (in minutes of arc), and the horizontal axis indicates the angular change of the second mirror L2. In FIG. 29, the vertical axes indicate the displacement of the reading points (in mm) projected to the cover glass plate 7b for the third mirror L3, and the horizontal axes indicate the displacement of the reading points (in mm) projected to the cover glass plate 7b for the second mirror L2. In FIGS. 28, 29, and 32, white triangles indicate the displacements of the reading point measured before adhesion, while black triangles indicate the displacements of the reading point measured after adhesion. In any of the samples, since the difference in the angular change of the third mirror L3 (having the largest sensitivity) is reduced when the adhesive is applied, the displacement of the reading point can be reduced. It should be noted that maximum displacement of the reading point and minimum displacement of the reading point are not necessarily at the endpoints of the temperature range (0° C. and 60° C.).

Figure 30:
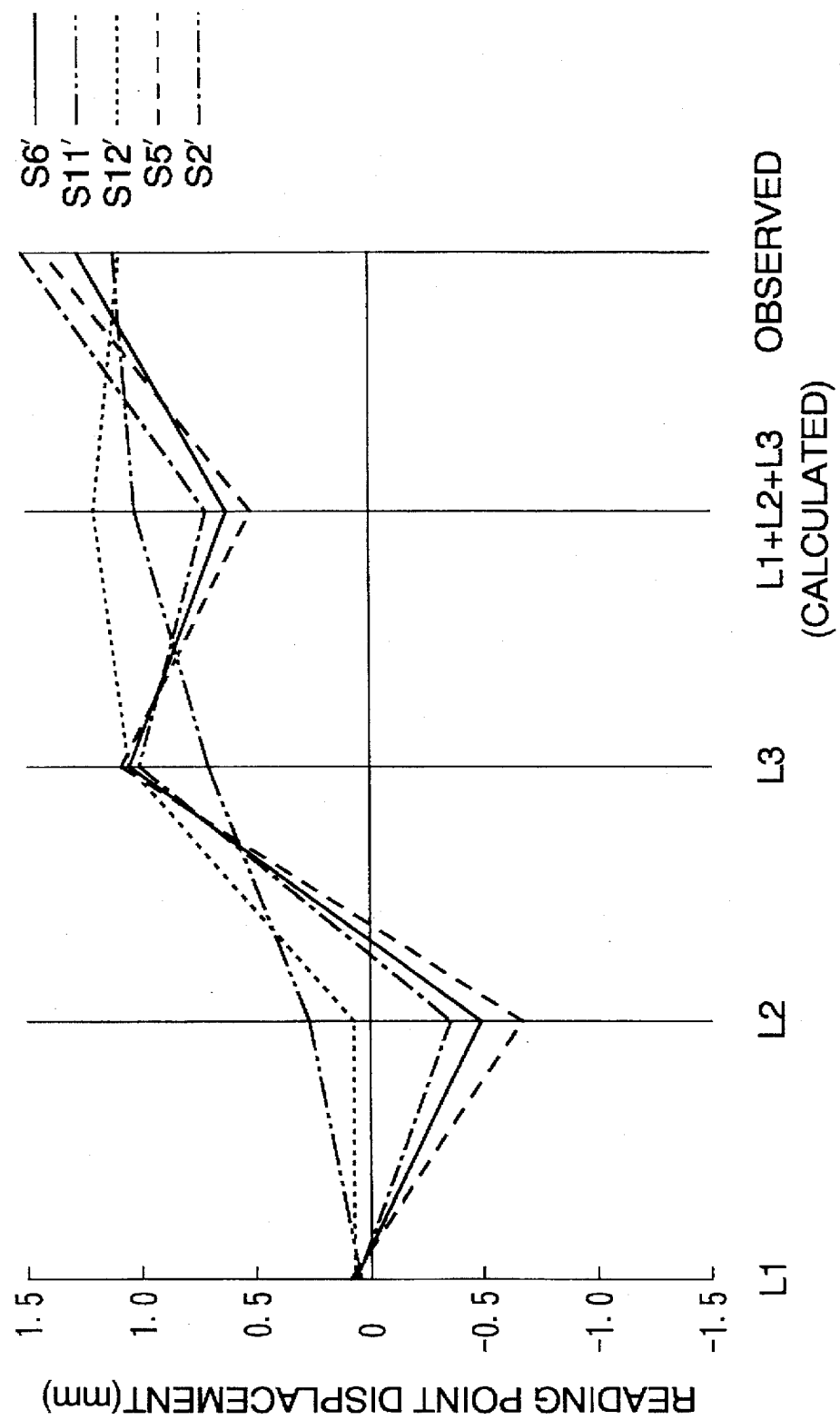
FIG. 30 is a chart showing calculated reading point displacement versus observed reading point displacement, preceding and following the application of adhesive, for the second through sixth experimental samples according to the second embodiment.
Figure 31:
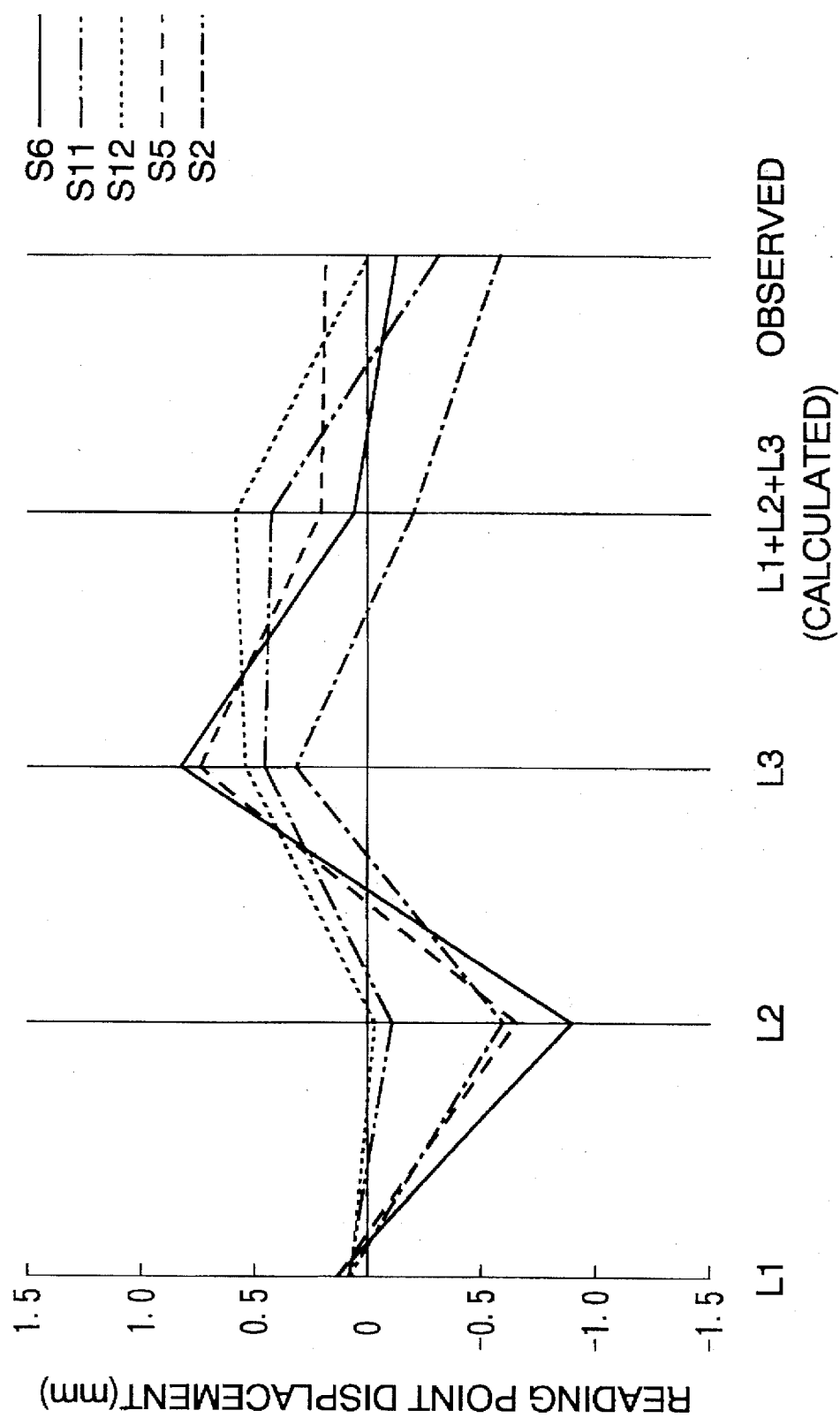
FIG. 31 is a chart comparing calculated individual reading point displacements for three mirrors L1, L2, and L3, calculated cumulative reading point displacement for the three mirrors, and observed total reading point displacement for the three mirrors, following the application of adhesive, for the second through sixth experimental samples according to the second embodiment.

FIG. 30 is a chart showing the relationship among the individual displacements calculated based on the differential angles of the mirrors L1, L2, and L3 using the aforementioned relations (1), (2), and (3), the calculated cumulative displacements of the reading point and the observed total displacements for the samples S2, S5, S6, S11 and S12 before bonding (denoted as S2', S5', S6', S11' and S12, respectively, in FIG. 30). FIG. 31 shows the same relationships after bonding.

Finally, FIG. 32 is a chart showing the maximum cumulative and total displacements of the reading point (i.e., calculated versus observed) between the cover glass plate 7b and the first and second portions 19 and 21, before and after bonding. The calculated cumulative displacements were calculated from the data in FIG. 28, and the observed total displacements were directly measured. In FIG. 32, the vertical axis indicates the calculated maximum cumulative displacement of the reading point and the horizontal axis indicates the observed maximum total displacement of the reading point. The five samples are again denoted S2, S5, S6, S11 and S12 after bonding and denoted S2', S5', S6', S11', and S12 before bonding. The maximum displacement is defined as the difference between the maximum and minimum values of displacement in the range from 0° C. to 60° C.

As can be seen in FIGS. 30, 31, and 32, the displacement of the reading point for each of the five samples S2, S5, S6, S11, and S12 is reduced by adhering the cover glass plate 7b to the first and second portions 19 and 21 of the housing 3.

Thus, according to the embodiments, by connecting the first and second portions 19 and 21 of the housing 3 through the cover glass plate 7 or 7b, the angular change during temperature variation of mirrors L2 and L3 supported by the first and second portions 19 and 20 is significantly reduced. Furthermore, the magnitude of angular change during temperature variation of the third mirror L3 thereby approaches that of the second mirror L2, and since the mirrors L2 and L3 generate displacement in the reading point in opposite directions, the respective displacements can be counterbalanced. Particular to the first embodiment, the creation of compressive stresses in the first and second portions 19 and 21 can absorb dimensional change during temperature fluctuation and thereby reduce angular change in the mirrors L2 and L3 and displacement of the reading point.

The present disclosure relates to subject matter contained in Japanese patent application No. Hei 7-065164, filed on Feb. 28, 1995, which is expressly incorporated herein by reference in its entirety.

What is claimed is:

1. An image reading device for reading an image of a scanned manuscript, said image reading device comprising:
   a plurality of mirrors to reflect light from the manuscript, thermally induced angular changes of two of said plurality of mirrors generating thermally-induced displacements of a reading point of an image in opposite directions;
   an imaging optical element that receives light reflected by said plurality of mirrors and forms an image of the manuscript;
   an image receiving element that detects the image formed by said imaging optical element;
   a housing comprising a first housing member and a second housing member, said mirrors, said imaging optical element and said image receiving element being mounted within said housing, at least one of said plurality of mirrors being supported by said first housing member and at least another one of said plurality of mirrors being supported by said second housing member;
   a reading window formed in said housing, said reading window positioned such that said first housing member and second housing member face each other across said reading window, said reading window extending perpendicularly to a direction of scanning of the manuscript;
   a cover glass plate for covering said reading window, light from the manuscript being transmitted through said reading window towards said plurality of mirrors; and
   a system that fixes said cover glass plate to said first housing member and to said second housing member to prevent independent movement of said first housing member and said second housing member in association with thermally-induced dimensional changes of said first and second housing members.

2. The image reading device according to claim 1, said plurality of mirrors comprising:
   a first mirror supported by said second housing member;
   a second mirror supported by said first housing member; and
   a third mirror supported by said second housing member;
   wherein said first mirror is positioned on said second housing member to reflect light from the manuscript, said second mirror is positioned on said first housing member to reflect light from said first mirror, and said third mirror is positioned on said second housing member to reflect light from said second mirror to said imaging optical element.

3. The image reading device according to claim 2, wherein said second mirror and said third mirror are arranged so that light reflects a plurality of times between said second and third mirrors.

4. The image reading device according to claim 1, wherein said cover glass plate is tightly fitted into a seating step formed around said reading window, and said cover glass plate connects said first housing member and said second housing member to prevent independent movement of said first housing member and said second housing member.

5. The image reading device according to claim 4, wherein said housing is made of plastic resin.

6. The image reading device according to claim 1, wherein said cover glass plate is bonded by an adhesive to said first housing member and to said second housing member, and said cover glass plate and said adhesive connect said first housing member and said second housing member to prevent independent movement of said first housing member and said second housing member.

7. The image reading device according to claim 6, wherein said adhesive is an ultraviolet curing adhesive.

8. The image reading device according to claim 6, wherein said housing is made of plastic resin.

9. An image reading device for reading an image of a scanned manuscript, said image reading device comprising:
   a plurality of mirrors for reflecting light from the manuscript;
   an imaging optical element for receiving light reflected by said plurality of mirrors and forming an image of the manuscript;
   an image receiving element for detecting the image formed by said imaging optical element;
   a plastic resin housing including a first housing member and a second housing member, said imaging optical element, said image receiving element, and said plurality of mirrors mounted within said housing, at least one of said plurality of mirrors being supported by said first housing member and at least another one of said plurality of mirrors being supported by said second housing member;
   a reading window formed in said housing such that said first housing member and said second housing member face each other across said reading window, said reading window extending perpendicularly to a scanning direction of the manuscript;
   a cover glass plate secured to said housing between said first housing member and said second housing member, said cover glass plate covering said reading window, light reflected from the manuscript being transmitted through said cover glass plate into said housing towards said plurality of mirrors;
   a system that peripherally connects said first housing member and said second housing member; and
   a system that limits thermally-induced angular changes of said plurality of mirrors, said angular changes of two of said plurality of mirrors generating thermally-induced displacements of a reading point of an image in opposite directions.

10. The image reading device according to claim 9, said plurality of mirrors comprising:
   a first mirror supported by said second housing member;
   a second mirror supported by said first housing member; and
   a third mirror supported by said second housing member;
   wherein said first mirror is positioned on said second housing member to reflect light from the manuscript, said second mirror is positioned on said first housing member to reflect light from said first mirror, and said third mirror is positioned on said second housing member to reflect light from said second mirror to said imaging optical element.

11. The image reading device according to claim 10, wherein said second mirror and said third mirror are arranged so that light reflects a plurality of times between said second and third mirrors.

12. The image reading device according to claim 9, wherein said cover glass plate is tightly fitted into a seating step formed around said reading window, and said cover glass plate connects said first housing member and said second housing member and limits said predetermined angular change of said plurality of mirrors.

13. The image reading device according to claim 12, wherein said housing is made of plastic resin.

14. The image reading device according to claim 9, wherein said cover glass plate is bonded by an adhesive to said first housing member and to said second housing member, and said cover glass plate and said adhesive connect said first housing member and said second housing member and limits said predetermined angular change of said plurality of mirrors.

15. The image reading device according to claim 14, wherein said adhesive is an ultraviolet curing adhesive.

16. The image reading device according to claim 14, wherein said housing is made of plastic resin.

17. An image reading device for reading an image of a scanned manuscript, said image reading device comprising:

a plurality of mirrors that reflect light from the manuscript;

an imaging optical element that receives light reflected by said plurality of mirrors and that forms an image of the manuscript;

an image receiving element that detects the image formed by the imaging optical element;

a plastic resin housing comprising a first housing member and a second housing member, said first housing member and said second housing member undergoing predetermined dimensional changes in response to thermal change, said plurality of mirrors, said imaging optical element and said image receiving element being mounted in said housing, at least one of said plurality of mirrors supported by said first housing member and at least another one of said plurality of mirrors supported by said second housing member;

a reading window formed in said housing, said reading window positioned so that said first housing member and said second housing member face each other across said reading window, said reading window extending perpendicularly to a scanning direction of the manuscript;

a cover glass plate for covering said reading window, light from said manuscript passing through said cover glass plate towards said plurality of mirrors; and a system that biases said first housing member and said second housing member so as to absorb a portion of said predetermined dimensional change, said cover glass plate being slightly larger than a seating step provided in said reading window, tight fitting of said cover glass plate within said seating step providing said biasing system.

18. The image reading device according to claim 17, said plurality of mirrors comprising:

a first mirror supported by said second housing member;

a second mirror supported by said first housing member; and a third mirror supported by said second housing member;

wherein said first mirror is positioned on said second housing member to reflect light from the manuscript, said second mirror is positioned on said first housing member to reflect light from said first mirror, and said third mirror is positioned on said second housing member to reflect light from said second mirror to said imaging optical element.

19. The image reading device according to claim 18, wherein said second mirror and said third mirror are arranged so that light reflects a plurality of times between said second and third mirrors.

20. The image reading device according to claim 17, wherein said cover glass plate is tightly fitted into a seating step formed around said reading window, and said cover glass plate biases said first housing member and said second housing member said housing so as to absorb a portion of said predetermined dimensional change.

21. The image reading device according to claim 20, wherein said housing is made of plastic resin.

22. An image reading device for reading an image of a scanned manuscript, said image reading device comprising:

a plurality of mirrors to reflect light from the manuscript;

an imaging optical element that receives light reflected by said plurality of mirrors and forms an image of the manuscript;

an image receiving element that detects the image formed by said imaging optical element;

a housing comprising a first housing member and a second housing member, said mirrors, said imaging optical element and said image receiving element being mounted within said housing, at least one of said plurality of mirrors being supported by said first housing member and at least another one of said plurality of mirrors being supported by said second housing member;

a reading window formed in said housing, said reading window positioned such that said first housing member and second housing member face each other across said reading window, said reading window extending perpendicularly to a direction of scanning of the manuscript;

a cover glass plate for covering said reading window, light from the manuscript being transmitted through said reading window towards said plurality of mirrors; and a system that connects said cover glass plate to said first housing member and to said second housing member to prevent independent movement of said first housing member and said second housing member in association with thermally induced dimensional changes of said first and second housing members, said cover glass plate being slightly larger than a seating step provided about said reading window, positioning of said cover plate glass on said seating step generating stresses in said first and second housing members, said connecting system comprising a bias force provided by said stresses.

* * * * *